(12) United States Patent
Timofeeva et al.

(10) Patent No.: US 10,153,511 B2
(45) Date of Patent: Dec. 11, 2018

(54) RECHARGEABLE NANOELECTROFUEL ELECTRODES AND DEVICES FOR HIGH ENERGY DENSITY FLOW BATTERIES

(71) Applicants: Elena V. Timofeeva, Chicago, IL (US); John P. Katsoudas, Chicago, IL (US); Dileep Singh, Naperville, IL (US); Carlo U. Segre, Chicago, IL (US)

(72) Inventors: Elena V. Timofeeva, Chicago, IL (US); John P. Katsoudas, Chicago, IL (US); Dileep Singh, Naperville, IL (US); Carlo U. Segre, Chicago, IL (US)

(73) Assignees: UCHICAGO ARGONNE, LLC, Chicago, IL (US); ILLINOIS INSTITUTE OF TECHNOLOGY, Chicago, IL (US)

( * ) Notice: Subject to any disclaimer, the term of this patent is extended or adjusted under 35 U.S.C. 154(b) by 261 days.

(21) Appl. No.: 14/889,939

(22) PCT Filed: May 9, 2014

(86) PCT No.: PCT/US2014/037485
§ 371 (c)(1),
(2) Date: Nov. 9, 2015

(87) PCT Pub. No.: WO2014/183028
PCT Pub. Date: Nov. 13, 2014

(65) Prior Publication Data
US 2016/0126581 A1    May 5, 2016

Related U.S. Application Data

(60) Provisional application No. 61/822,208, filed on May 10, 2013.

(51) Int. Cl.
*H01M 8/18* (2006.01)
*H01M 4/90* (2006.01)
(Continued)

(52) U.S. Cl.
CPC ......... *H01M 8/188* (2013.01); *H01M 4/9091* (2013.01); *H01M 8/04186* (2013.01);
(Continued)

(58) Field of Classification Search
CPC ....... H01M 4/9091; H01M 8/18; H01M 8/188
(Continued)

(56) References Cited

U.S. PATENT DOCUMENTS 8,227,022 B2     7/2012   Magdassi et al.
2008/0209876 A1  9/2008   Miller
(Continued)

OTHER PUBLICATIONS

Duduta et al., "Semi-Solid Lithium Rechargeable Flow Battery," Adv. Energy Mater. 2011, 1, pp. 511013516.
(Continued)

*Primary Examiner* — Basia A Ridley
*Assistant Examiner* — James M Erwin
(74) *Attorney, Agent, or Firm* — Foley & Lardner LLP

(57) ABSTRACT

Nanoelectrofuel compositions include a plurality of electroactive surface-treated or surface modified nanoparticles dispersed in an electrolyte or self suspended and exhibit fluid characteristics are provided. A Redox flow cell may employ the nanoelectrofuels compositions, wherein the redox flow cell includes a first inlet and a first outlet in fluid communication with a first half-cell body, a second inlet and a second outlet in fluid communication with a second half-cell body, a third cell body, and an ion-conductive membrane separating the first half-cell body from the second half-cell body and defining the second half-cell body.

18 Claims, 17 Drawing Sheets

(51) Int. Cl.
 H01M 8/04186 (2016.01)
 H01M 8/04082 (2016.01)
 H01M 8/20 (2006.01)

(52) U.S. Cl.
 CPC ......... H01M 8/04201 (2013.01); H01M 8/20 (2013.01); *Y02E 60/528* (2013.01)

(58) Field of Classification Search
 USPC .......................................................... 429/81
 See application file for complete search history.

(56) References Cited

U.S. PATENT DOCUMENTS

| | | |
|---|---|---|
| 2010/0047671 A1 | 2/2010 | Chiang et al. |
| 2010/0291429 A1 | 11/2010 | Farmer |
| 2011/0189520 A1* | 8/2011 | Carter ................. B60L 11/1879 429/107 |
| 2012/0039824 A1 | 2/2012 | Archer et al. |
| 2012/0258345 A1 | 10/2012 | Zaffou et al. |

OTHER PUBLICATIONS

International Search Report and Written Opinion in International Application No. PCT/US2014/037485, dated Jan. 22, 2015 (17 pages).

Skyllas-Kazacos et al., "Progress in Flow Battery Research and Development," Journal of The Electrochemical Society, 158 (8) R55-R79 (2011).

Weber et al., "Redox flow batteries: a review," J Appl Electrochem (2011)41: pp. 11370131164.

* cited by examiner

RECHARGEABLE NANOELECTROFUEL ELECTRODES AND DEVICES FOR HIGH ENERGY DENSITY FLOW BATTERIES

CROSS-REFERENCE TO RELATED APPLICATIONS

This application is a U.S. national stage application under 35 U.S.C. § 371 of International Application No. PCT/US2014/037485, filed May 9, 2014, which in turn claims the benefit of U.S. Provisional Patent Application Nos. 61/822,208, filed on May 10, 2013, the entire disclosures of which are incorporated herein by reference for any and all purposes.

GOVERNMENT RIGHTS

The United States Government has rights in this invention pursuant to Contract No. DE-AC02-06CH11357 between the U.S. Department of Energy and UChicago Argonne, LLC, representing Argonne National Laboratory.

FIELD

The present technology is generally related to redox flow materials and devices for electrical energy storage and conversion.

BACKGROUND

The following description is provided to assist the understanding of the reader. None of the information provided or references cited is admitted to be prior art to the present technology.

Redox flow devices are electrochemical systems wherein the oxidation and reduction of two different chemical species (ions) from cathodic and anodic solutions take place on inert electrodes (current collectors). In redox flow batteries, energy is stored and released through a reversible electrochemical reaction between two electrolytes which are separated by ion-conductive membrane, and contain dissolved redox-active ions. The cathodic and anodic electrolytes are stored externally to the battery and circulated through the cell(s) of the reactor on opposite sides of an ionically transporting membrane. Flow batteries can be rechargeable and their energy capacity is typically determined by the mass of the electroactive materials, i.e. limited by solvability of redox ions and the amount of the electrolyte in storage tanks.

Because of the large scale energy storage capacity and low energy density, redox flow devices and batteries are conventionally used in stationary applications, e.g. with renewable energy systems such as solar cells and wind power. However, conventional redox flow batteries tend to have low energy densities due to the limited solubility of the redox salts that are typically employed and have relatively poor energy-to-volume ratio. There is, therefore, a need for redox flow devices and flowable redox materials which have high energy density per volume so that they can be used in portable or mobile applications such as transportation, portable military devices, local grid leveling, communication devices, and the like.

SUMMARY

Embodiments herein include but are not limited to, nanoelectrofuel compositions, methods of making and using them, and devices which utilize them.

Accordingly, in one aspect a nanoelectrofuel composition is provided. The nanoelectrofuel composition includes a plurality of electroactive (redox) nanoparticles. In some embodiments, the electroactive nanoparticles are dispersed in an electrolyte. In some embodiments, the electroactive nanoparticles are self-suspended. According to some embodiments, the electroactive nanoparticles are surface-treated or surface modified. The nanoparticles include a metal, an intermetallic, a metal oxide, a mixed metal oxide, a metal phosphate, partially fluorinated metal oxides and phosphates, a metal alloy or a carbonaceous material. In some embodiments, the nanoparticles have at least one dimension of about 1 nm to about 500 nm. The nanoparticles may be surface-treated or surface-modified with one or more organic groups selected from a type of surface anchor, an electron conductor, an ion conductor, or a dispersant. The nanoparticle size may be smaller than a self-healing crystal threshold.

The nanoparticles are dispersed in an electrolyte which includes a salt of an intercalating element and a polar aprotic solvent. In some embodiments, the salt includes $Li[(C_2O_4)_2B]$, $Li[BF_2(C_2O_4)]$, $Li[PF_2(C_2O_4)_2]$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, or a lithium alkyl fluorophosphate. In some embodiments, the polar aprotic solvent includes ethylene carbonate, dimethyl carbonate, diethyl carbonate, ethylmethyl carbonate, dipropyl carbonate, propylene carbonate, methyl butyrate, γ-butyrolactone, N-methylpyrrolidinone, or vinylene carbonate. In some embodiments, the electrolyte includes an aqueous solution comprising a salt selected from a chloride, perchlorate, phosphate, sulphate, or nitrate. In some embodiments, the salt includes $LiCl$, $NaCl$, $KCl$, $CaCl_2$, $MgCl_2$, $NH_4Cl$, $LiClO_4$, $NaClO_4$, $KClO_4$, $NH_4ClO_4$, $Ca(ClO_4)_2$, $Mg(ClO_4)_2$, $Na_2HPO_4$, $NaH_2PO_4$, $KH_2PO_4$, $K_2HPO_4$, $Li_2HPO_4$, $Li_3PO_4$, $Li_2SO_4$, $Na_2SO_4$, $K_2SO_4$, $(NH_4)_2SO_4$, $LiNO_3$, $NaNO_3$, $KNO_3$, $NH_4NO_3$, or $KNO_2$.

In some embodiments, the electroactive nanoparticles includes intercalating elements (A), transition metals (M), $A_yMO_x$, $A_yM_1M_2O_x$, $A_yMPO_4$, $A_yM_1M_2PO_4$, intermetallics, intermetallic alloys, metal oxides, or carbonaceous materials, wherein y is from 0 to 2, and x is from 2 to 4. In some embodiments, the electroactive nanoparticles includes H, Li, Na, Mg, Sn, Ca, Zn, Al, Si, Ge, B, Y, Zr, Mn, Fe, Co, Ni, Cu, Zn, Ag, In, Sn, Sb, Bi, La, Ce, Mg, Sr, Ba, Ca, Ti, V, Al, Si, Hf, Nb, Ta, Cr, V, W, Mo, $Cu_6Sn_5$, $Co_2Sn$, $Ni_3Sn_4$, InSn, FeAl, $Fe_3Al$, NiAl, FeCoV, $FeO_x$, MgO, $NiO_x$, $SrO_x$, $ZnO_x$, $TiO_2$, $CeO_2$, $V_xO_y$, $ZrO_x$, $SnO_x$, $SiO_x$, $Ag_xO$, $W_xO_y$, $Fe_xO_y$, $Mn_xO_y$, $Co_xO_y$, $Cr_xO_y$, $Mo_xO_y$, fullerenes, fullerites, graphite, graphene, multilayered graphene sheets, graphene nanoribbons, carbon nanotubes, activated carbon, and carbon composites with transitional metal oxides, Si, Sn, Bi, Ge, intermetallic alloys such as $Cu_6Sn_5$.

In some embodiments, the nanoelectrofuel composition includes from about 10% to about 60% by volume of the nanoparticles dispersed in an electrolyte. In other embodiments, the nanoelectrofuel composition includes up to 80 vol % of self-suspended nanoparticles.

In another aspect, a method for preparing a nanoelectrofuel composition is provided, which includes contacting electroactive nanoparticles with a surface-modifying agent; and dispersing the surface-modified nanoparticles in an electrolyte to provide a stable nanoparticle suspension. In some embodiments, the nanoparticles are contacted with the surface-modifying agent at a temperature of less than, or equal to, 150° C. in a liquid or gaseous phase. In some embodiments, the dispersing includes sonicating or high-impact ball milling of the surface-modified nanoparticles in the electrolyte.

In yet other aspect, a method for preparing a self-suspended nanoelectrofuel is provided. The method includes anchoring an electroactive nanoparticle to a organic cation of an ionic liquid to form an ionic nanofluid. In some embodiments, the organic cation includes a mercapto-alkyl-ammonium salt, a mercapto-imidazolium salt, a mercapto-phosphonium salt, or a mercapto-pyrrolidonium salt. In some embodiments, the anchoring is conducted in a solvent. In some embodiments, the solvent includes an alcohol, ether, a ketone, or a carbonate. In some embodiments, after the nanofluid is formed, the method further includes evaporating the solvent. In some embodiments, to achieve liquid behaviors of solventless nanoelectrofuels the organic anion is added in an approximately 1:1 mol ratio to the amount of organic cation anchored to the electroactive nanoparticles. In some embodiments, the solventless ionic nanofluid has a viscosity of less than 10,000 cP, at room temperature. In some embodiments, the ionic fluid has a viscosity of less than 100 cP, at room temperature.

In yet another aspect, a redox flow cell is provided including a first half-cell body and a second half-cell body. The first half-cell body includes a first inlet in fluid communication with a first outlet. The second half-cell body includes a second inlet in fluid communication with a second outlet. A membrane separates the first half-cell body from the second half-cell body. A retaining member is configured to secure the second half-cell body within the first half-cell body. In some embodiments, the first half-cell body containing a first current collector, is at least partially radially disposed around a portion of the second half-cell body containing a second current collector.

In one embodiment, the first half-cell body comprises a cylindrical well orthogonally disposed in relation to a flow path defined by the first inlet and the first outlet, the cylindrical well having a bottom end distal to an open end. In one embodiment, the second half-cell body comprises a cylindrically shaped body having a first end and a second end, the second end being distal to the first end, and the first end comprising a first seal. In some embodiments, the retaining member comprises a cylindrically-shaped body having a smooth thru hole bore configured to receive the second inlet, and configured to seal against the second inlet or the second half-cell body, and an outer seal configured to seal against the first half-cell body. In some embodiments, the second half-cell body is configured to be inserted into the cylindrical well of the first half-cell body, the second half-cell body further comprising a first seal configured to engage at or near the bottom end of the cylindrical well, and a second seal configured to engage the retaining member, and the retaining member configured to seal at or near the open end of the cylindrical well, thereby forming a sealed first chamber radially surrounding a second sealed chamber. In one embodiment, the first current collector includes a first conductive shot, a first conductive fiber, or a first conductive mesh. In one embodiment, the second current collector includes a second conductive shot, a second conductive fiber, or a second conductive mesh. In some embodiments, the first current collector is of a morphology diameter sufficient to provide adequate flow of the nanoelectrofuel through the first chamber. In some embodiments, the second current collector is of a morphology diameter sufficient to provide adequate flow of the nanoelectrofuel through the second chamber.

In another aspect, a redox flow battery is provided, which includes a redox flow cell, a first nanoelectrofuel reservoir in fluid communication with the first inlet or second inlet, and a second nanoelectrofuel reservoir in fluid communication with the other of the first inlet or second inlet.

In one embodiment, the redox flow battery further includes a first pump configured to pump a first nanoelectrofuel from the first nanoelectrofuel reservoir through the first half-cell body, and a second pump configured to pump the second nanoelectrofuel from the second nanoelectrofuel reservoir through the second half-cell body. In some embodiments, the first nanoelectrofuel includes an anodic or a cathodic nanoelectrofuel, and the second nanoelectrofuel includes the other of the anodic or the cathodic nanoelectrofuel. In some embodiments, the redox flow battery includes a first nanoelectrofuel collection reservoir in fluid communication with the first or second outlet and corresponding to the first nanoelectrofuel reservoir, and a second nanoelectrofuel collection reservoir in fluid communication with the first or second outlet and corresponding to the second nanoelectrofuel reservoir. In some embodiments, the first and the second nanoelectrofuel reservoirs are soft body reservoirs configured to expand and contract as they are filled or emptied, respectively.

In other embodiments, first nanoelectrofuel reservoir and second nanoelectrofuel reservoir are separate reservoirs. In some embodiments, the flow battery has only two nanoelectrofuel reservoirs—one for cathodic nanoelectrofuels and one for anodic nanoelectrofuels with inlet and outlet fluid mixing. In other embodiment, the flow battery has four separate nanoelectrofuel reservoirs—an inlet and outlet reservoirs for the cathodic nanoelectrofuel, and inlet and outlet reservoirs for anodic nanoelectrofuel.

In yet another aspect, a redox flow battery is provided, which includes a redox flow cell, a first nanoelectrofuel reservoir in fluid communication with the first inlet or second inlet, and wherein the second half-cell body is configured as an air electrode. In some embodiments, the first nanoelectrofuel reservoir include an anodic nanoelectrofuel. In some embodiments, the first and second nanoelectrofuel reservoirs each independently include a nanoelectrofuel inlet, and the first and second nanoelectrofuel collection reservoirs each independently include a nanoelectrofuel outlet. In some embodiments, the flow of the nanoelectrofuel is adjustable to accommodate full discharge on either a single or a multiple passage of the fluid through the battery.

In some embodiments, the redox flow battery includes a plurality of flow cells in series or parallel.

The foregoing summary is illustrative only and is not intended to be in any way limiting. In addition to the illustrative aspects, embodiments and features described above, further aspects, embodiments and features will become apparent by reference to the following drawings and the detailed description.

BRIEF DESCRIPTION OF THE FIGURES

The foregoing and other features of the present disclosure will become more fully apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

BRIEF DESCRIPTION OF THE DRAWINGS

Figure 1:
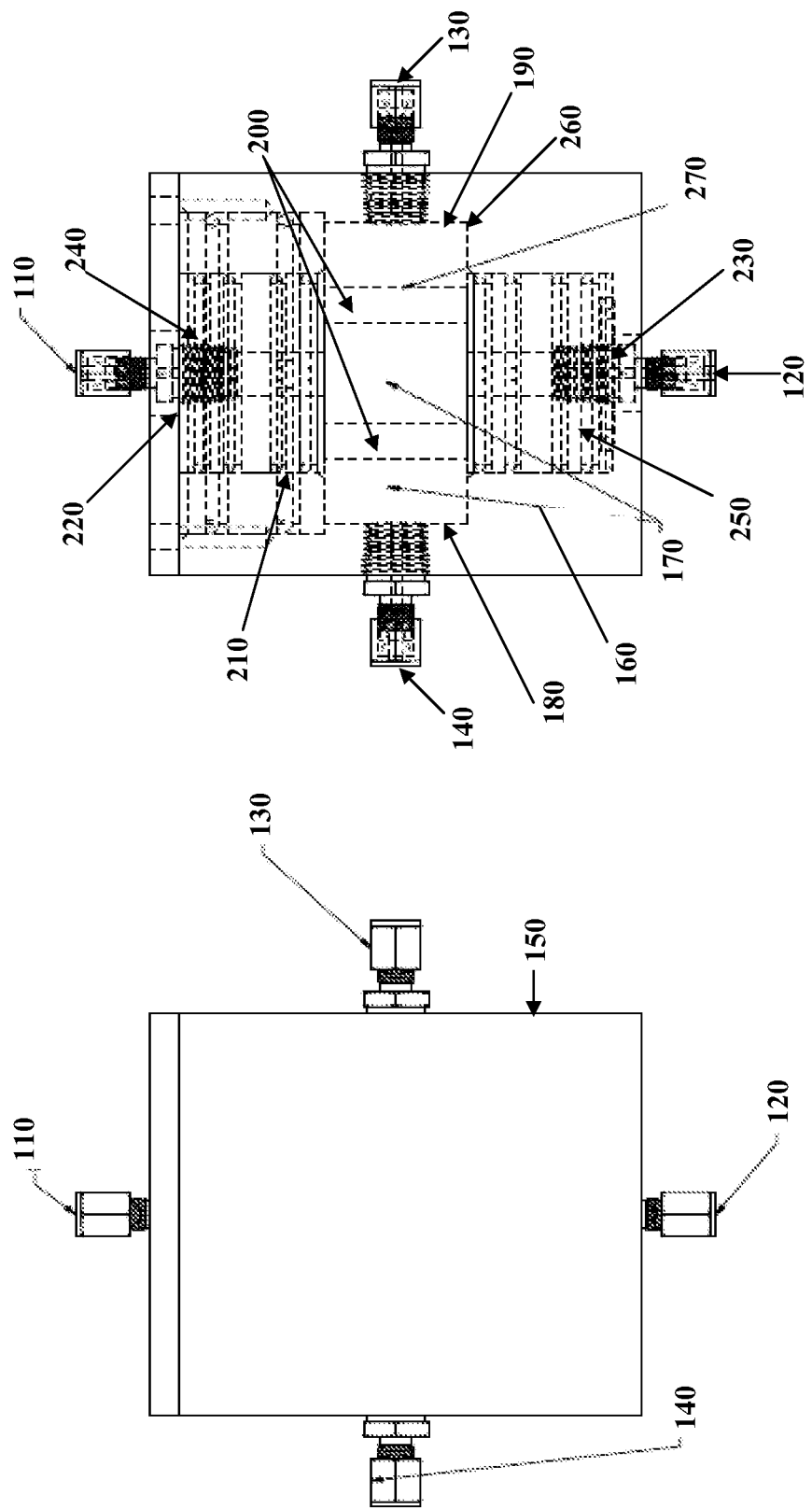

FIG. 1 depicts a schematic view of the external and internal structures, in one embodiment of the redox flow cell, according to one embodiment.

Figure 2:
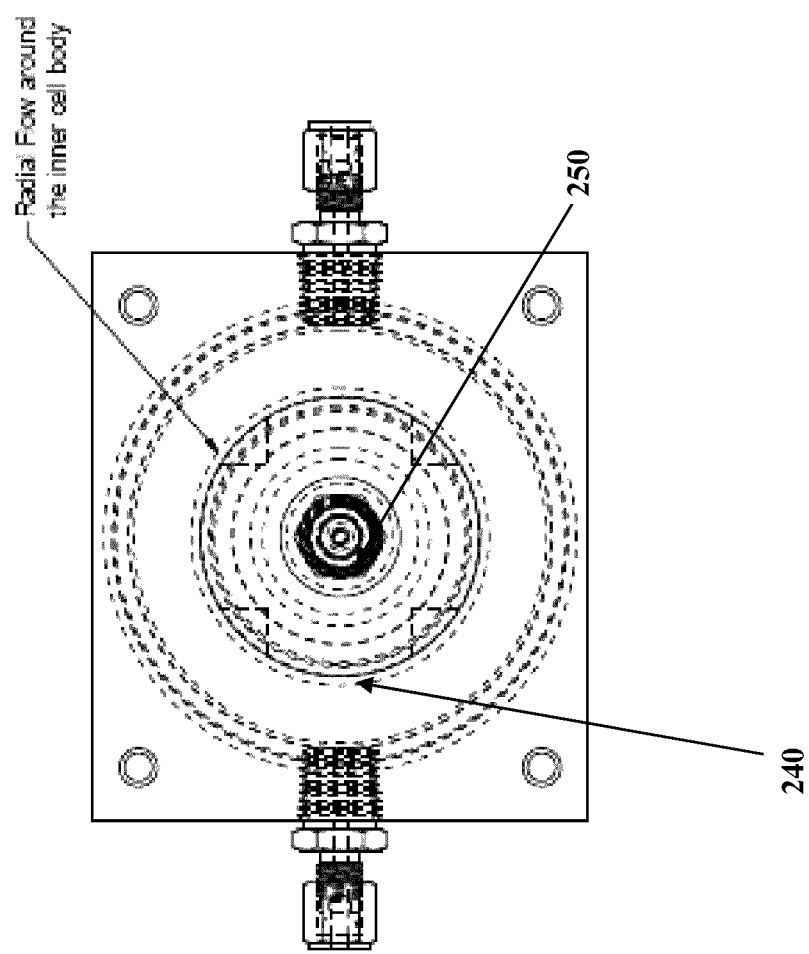

FIG. 2 depicts a schematic view of a cross-section of one embodiment of the redox flow cell, according to one embodiment.

Figure 3:
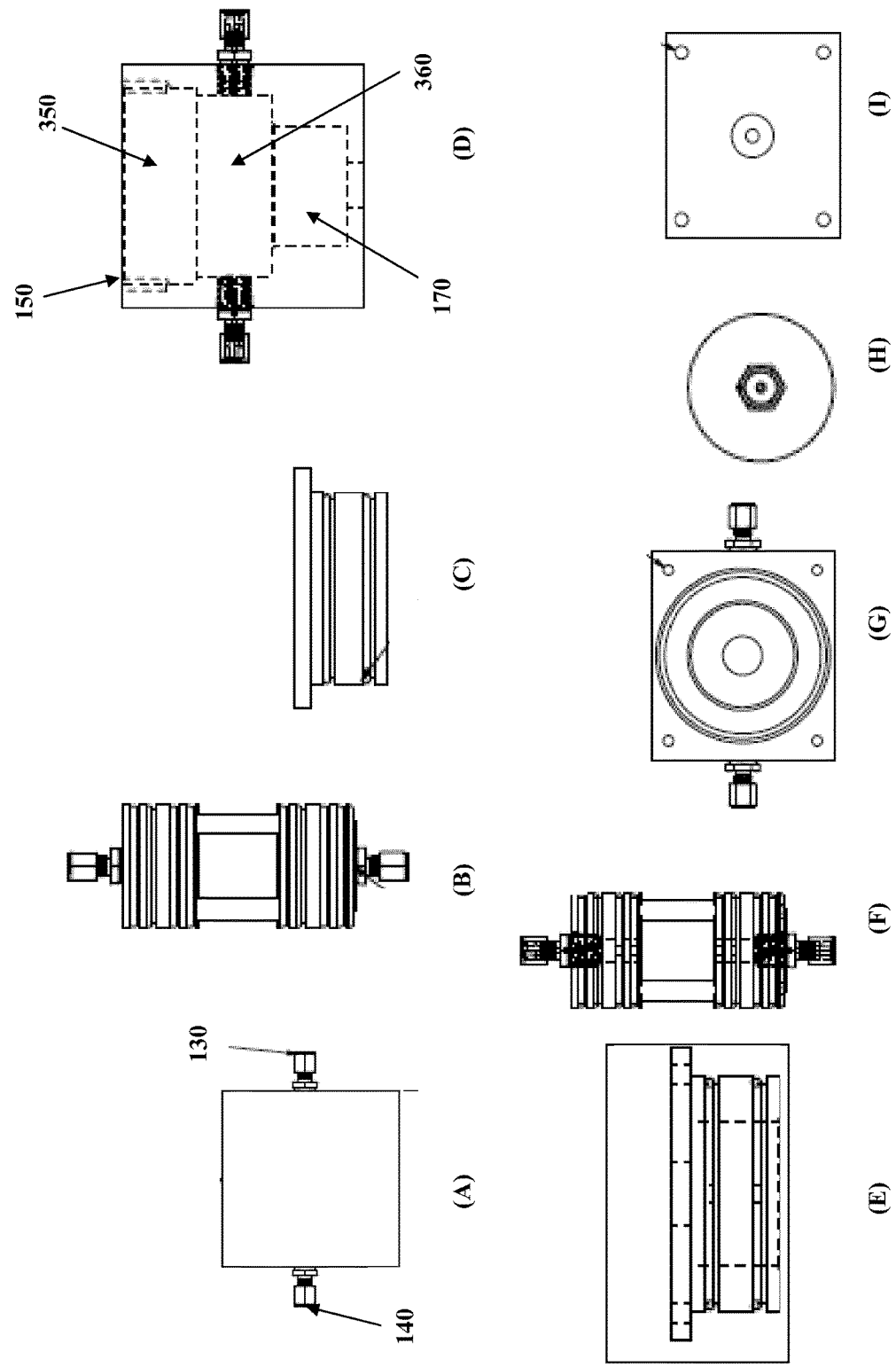

FIG. 3 depicts a schematic view of various parts of one embodiment of the redox flow cell, according to one embodiment.

Figure 4:
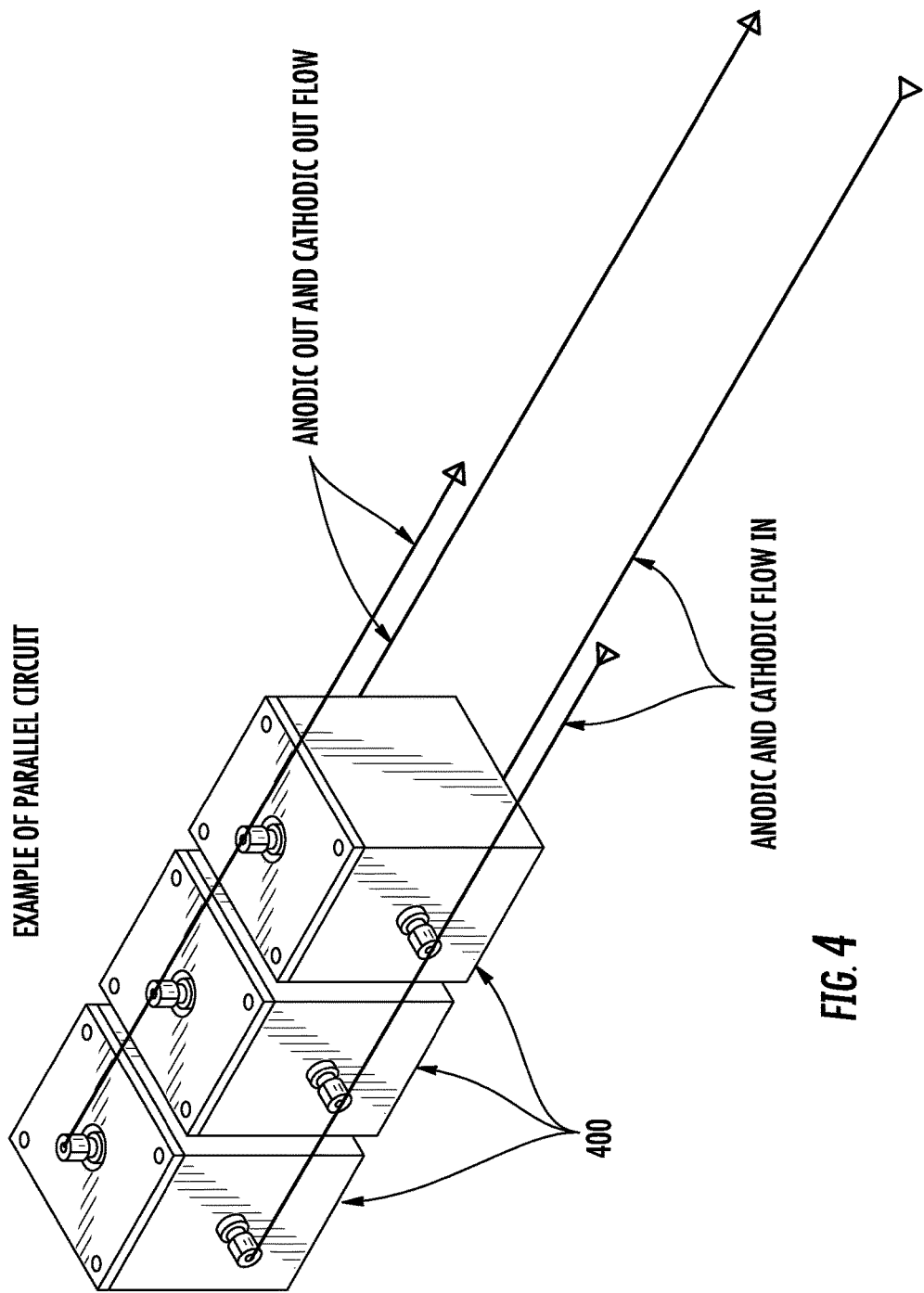

FIG. 4 depicts a schematic diagram of three redox flow cells in a parallel circuit configuration, according to one embodiment.

Figure 5A:
Figure 5B:
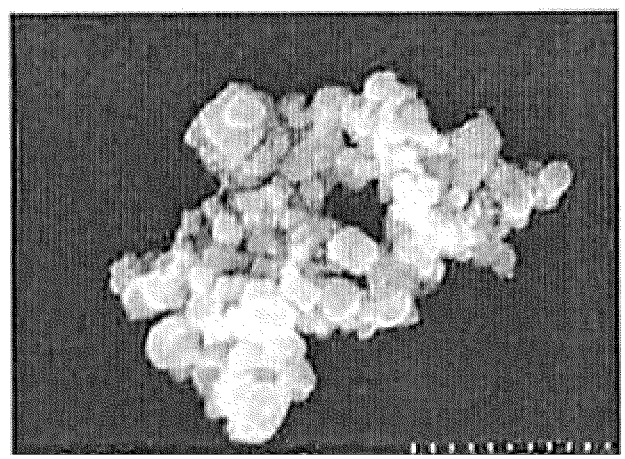

FIGS. 5A and 5B show scanning electron microscope (SEM) images of graphene oxide platelets (f-GnP) decorated with polyoxotungstate (PW12) and $Cu_6Sn_5$ nanoparticles, respectively, which are used in nanoelectrofuel preparation, according to the examples.

Figure 6:
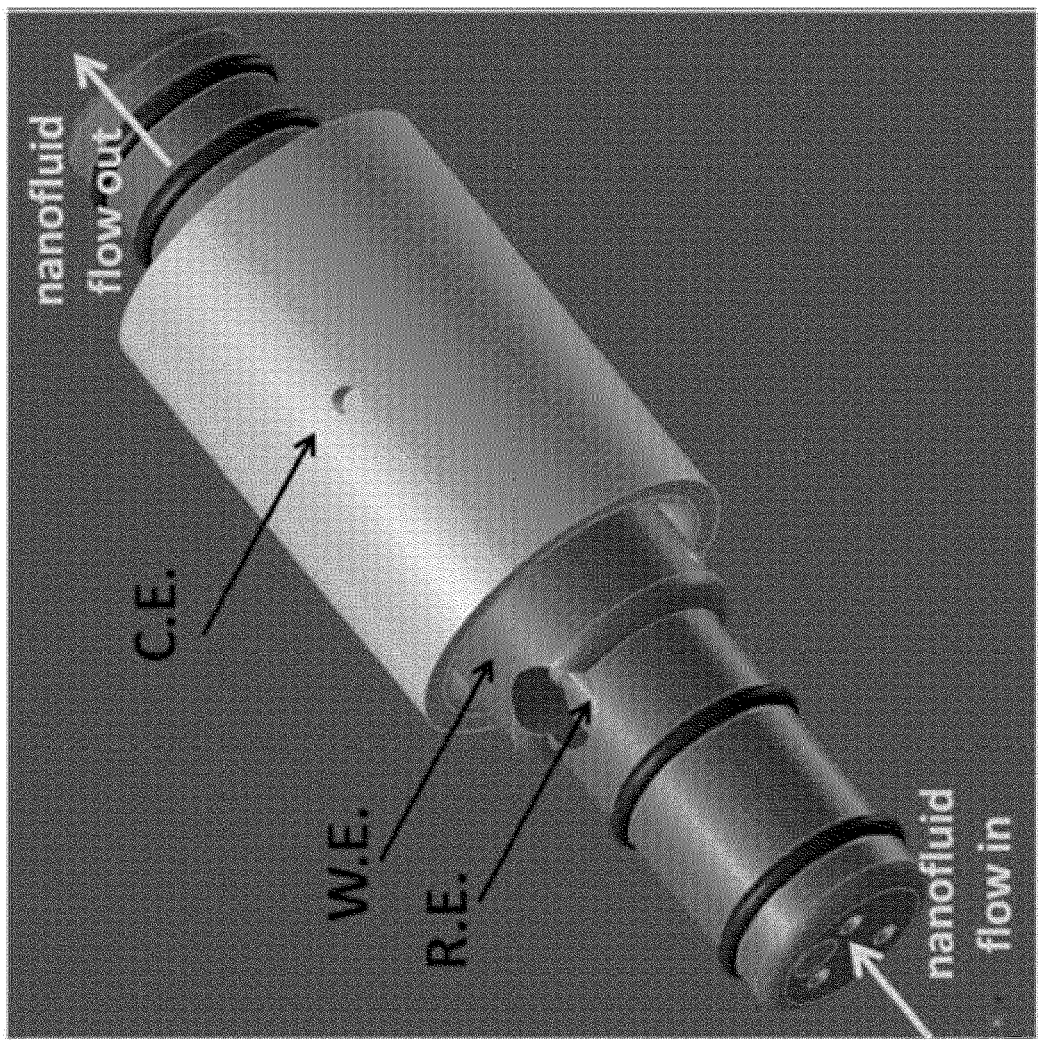

FIG. 6 shows a horizontal half-flow cell design and the electrochemical test set-up used to test the cell, respectively, according to one embodiment.

Figure 7:
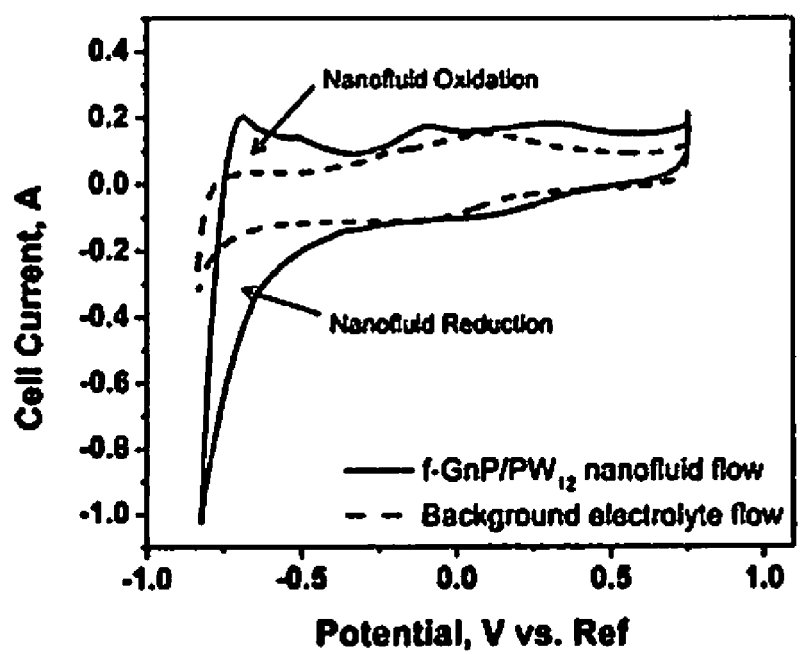

FIG. 7 illustrates a graph of CV of the water based f-GnP/PW12 nanoelectrofuels at 10 ml/min flow rate, according to the examples.

Figure 8:
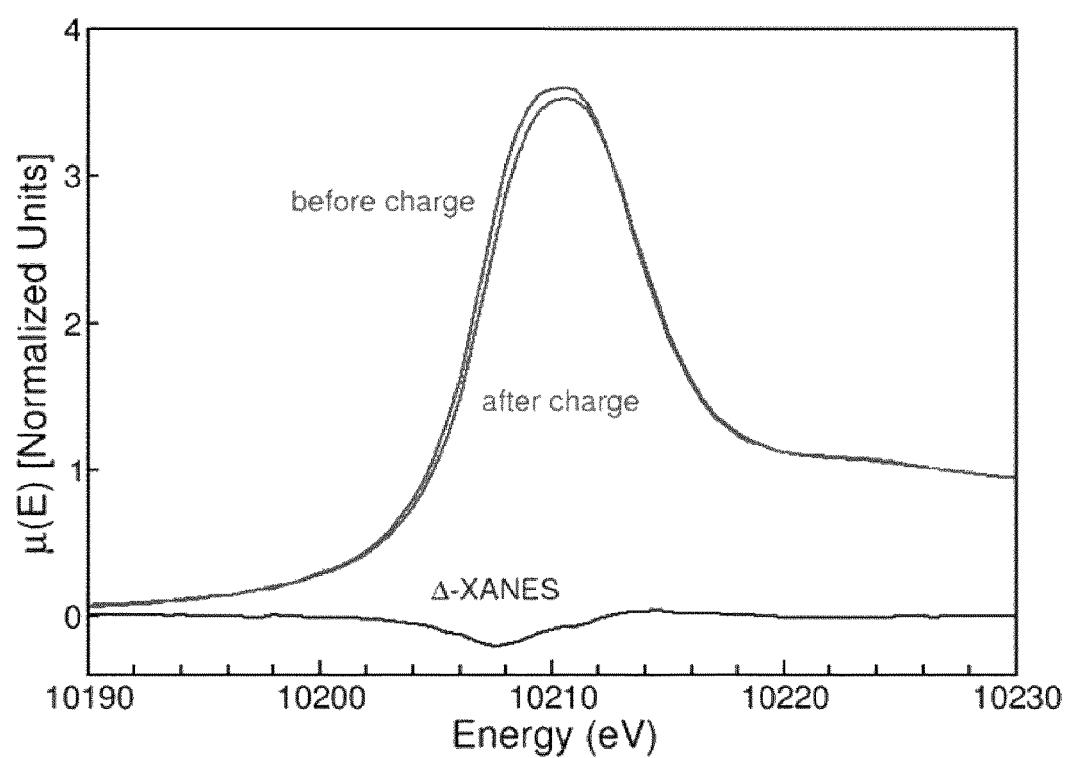

FIG. 8 illustrates a shift of a delta XANES spectra after reduction of the f-GnP/PW12 nanoelectrofuel in a flow cell, according to the examples.

Figure 9:
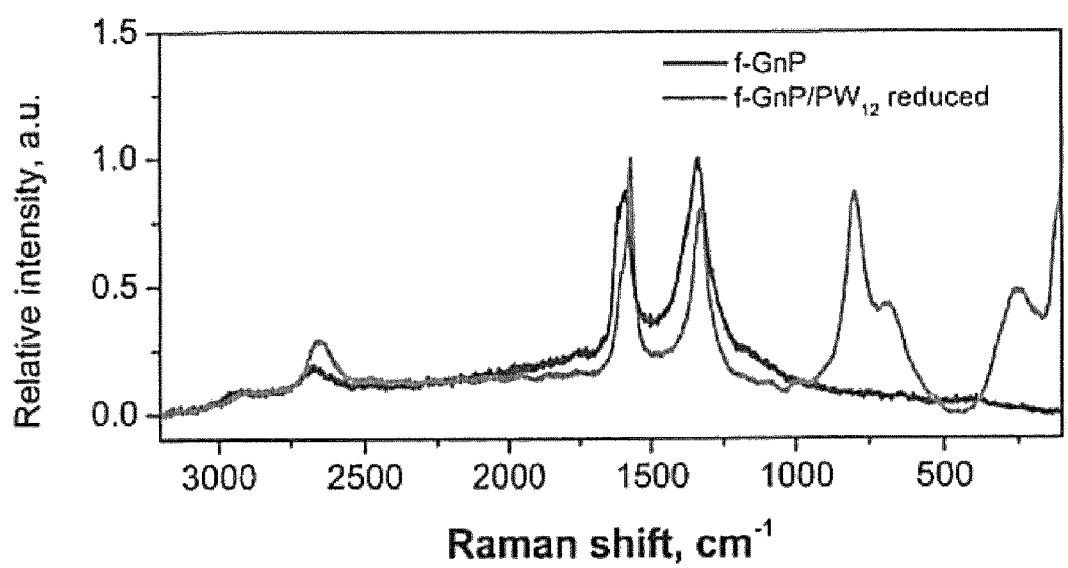

FIG. 9 illustrates the Raman spectra of unmodified f-GnP and f-GnP/PW12 after electrochemical treatment, according to the examples.

Figure 10:
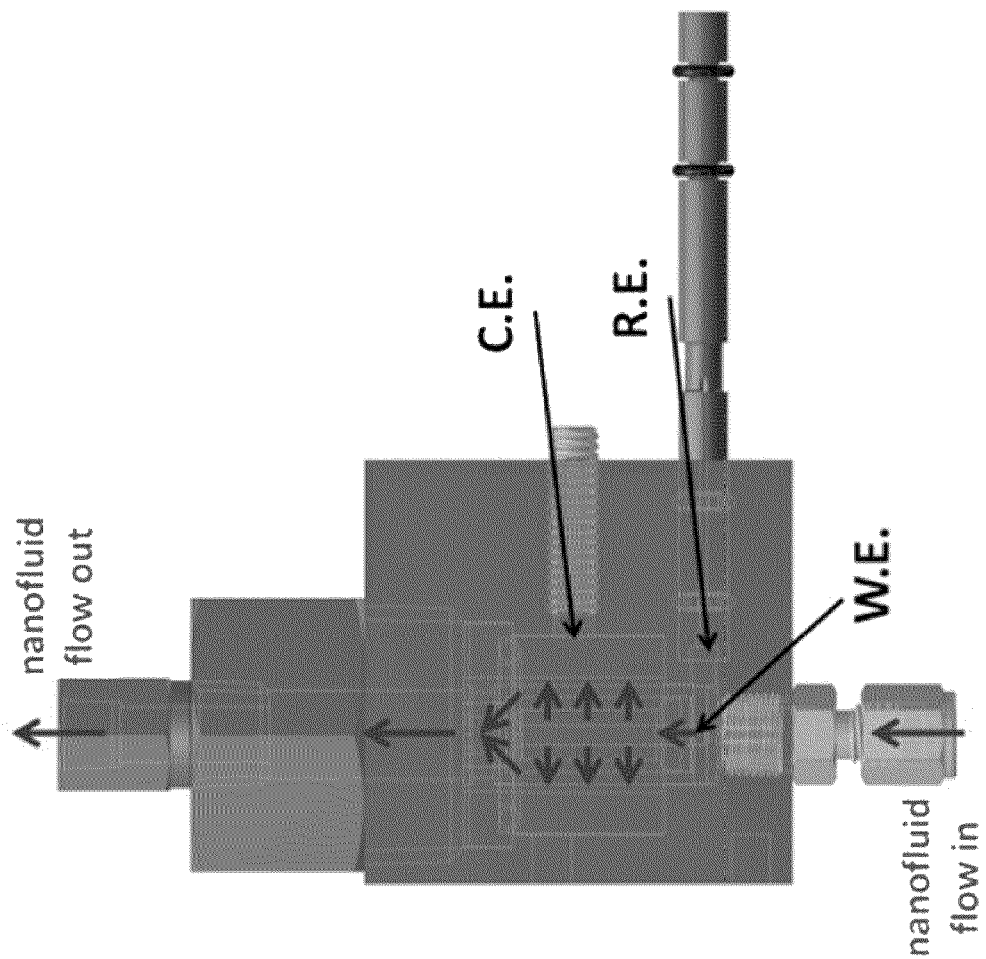

FIG. 10 shows a half-flow cell design, according to one embodiment.

Figure 11:
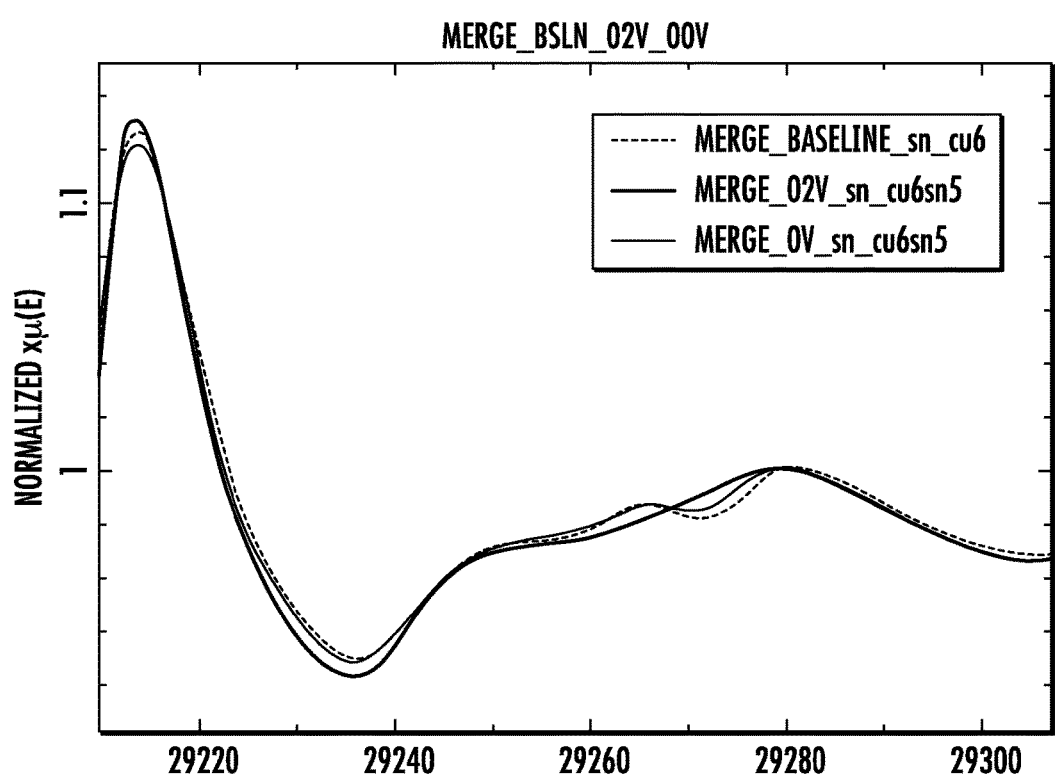

FIG. 11 illustrates a graph showing the changes in EXAFS region observed in $Cu_6Sn_5$ nanoelectrofuels upon lithiation, according to the examples.

Figure 12A:
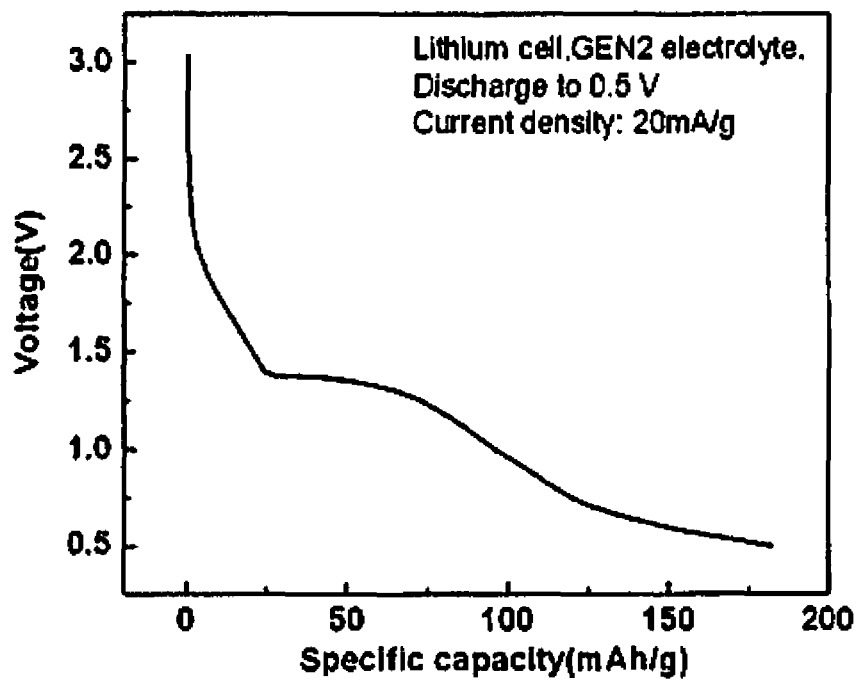
Figure 12B:
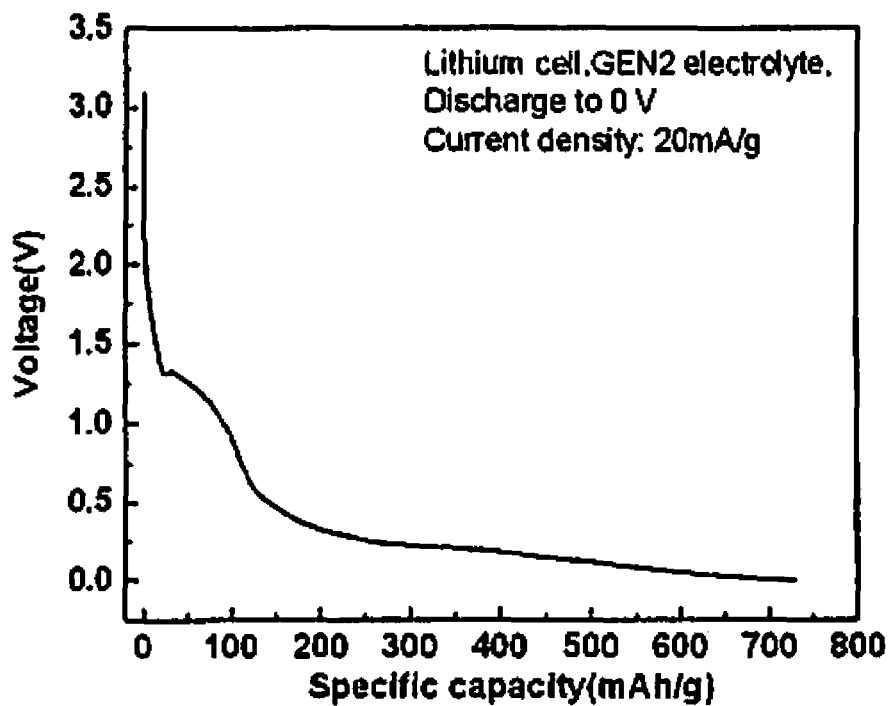

FIGS. 12A and 12B illustrate the XAS spectra of $Cu_6Sn_5$ electrode lithiated to 0.5V $Li/Li^+$ in the coin cell and $Cu_6Sn_5$ electrode lithiated to 0.0V $Li/Li^+$ in the coin cell, respectively, according to the examples.

Figure 13A:
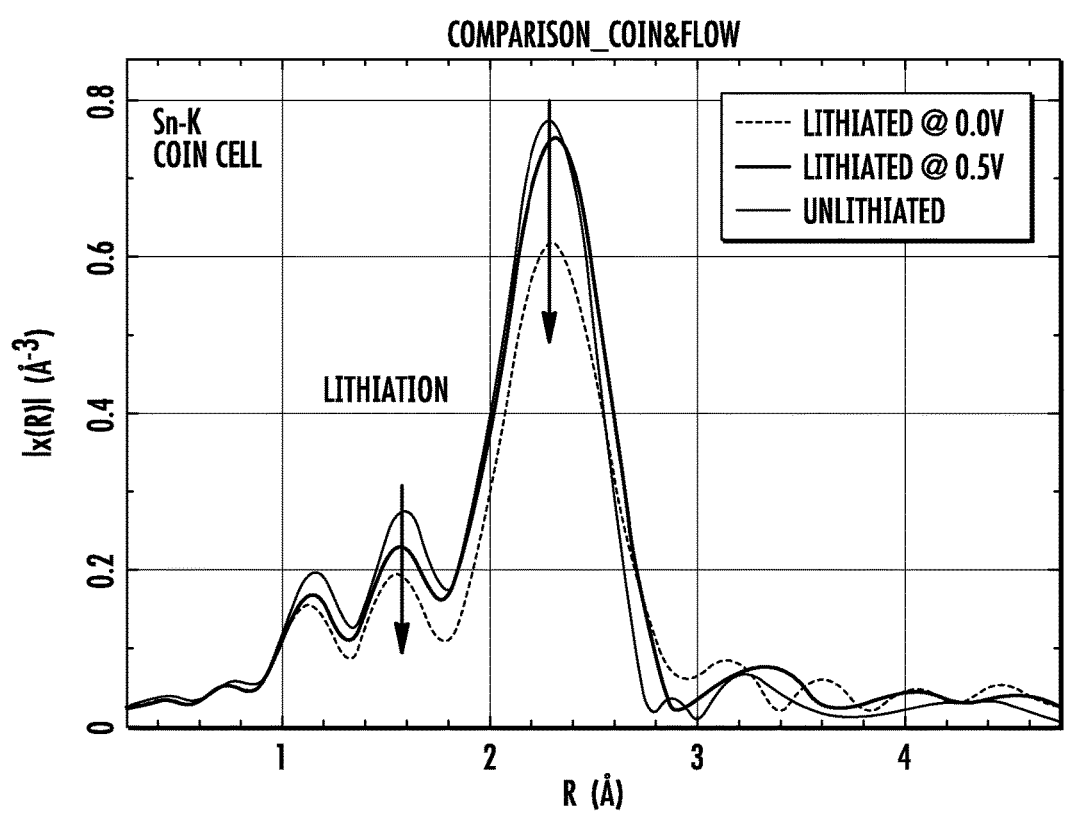
Figure 13B:
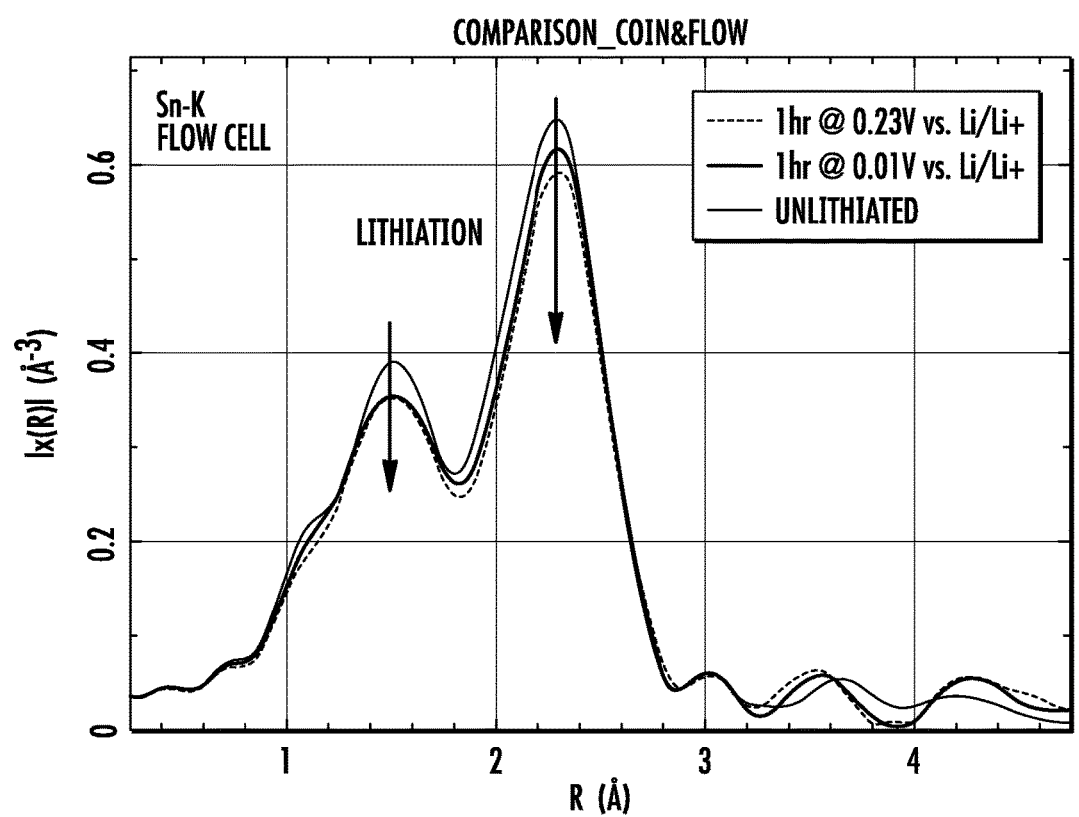

FIGS. 13A and 13B illustrate the ex-situ EXAFS spectra of $Cu_6Sn_5$ particles extracted from a coin cell at different charging steps and $Cu_6Sn_5$ nanofluid extracted from a flow cell at different charging steps, respectively, according to the examples.

Figure 14:
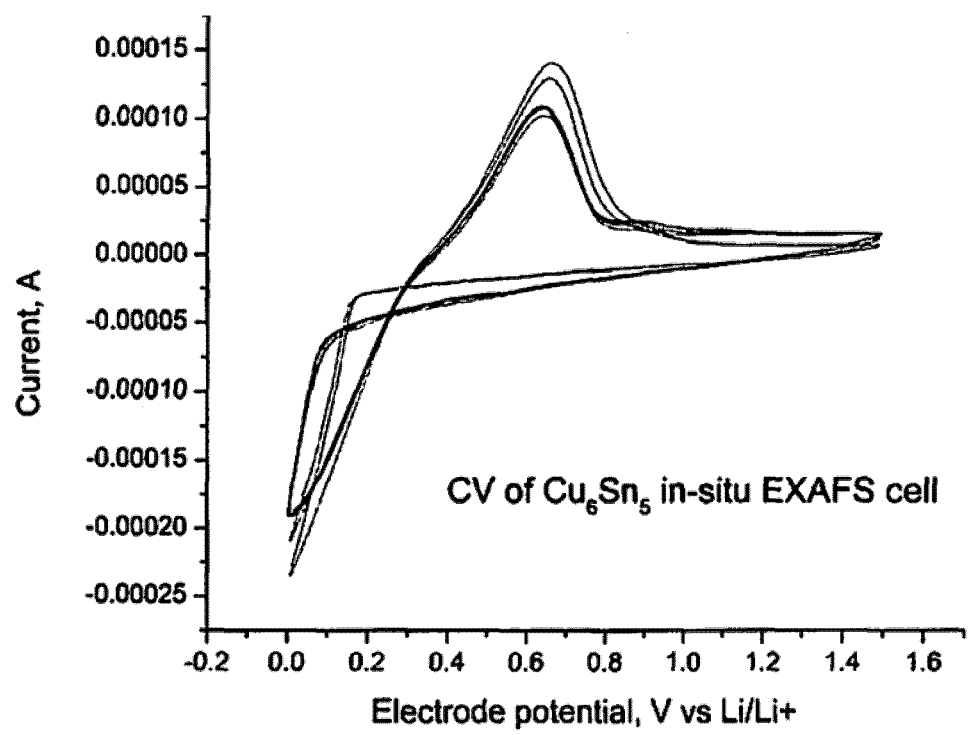

FIG. 14 illustrates a graph of CV of the $Cu_6Sn_5$ nanoparticles at 5 mV/sec scan rate in in-situ XAS coin cell, according to the examples.

Figure 15A:
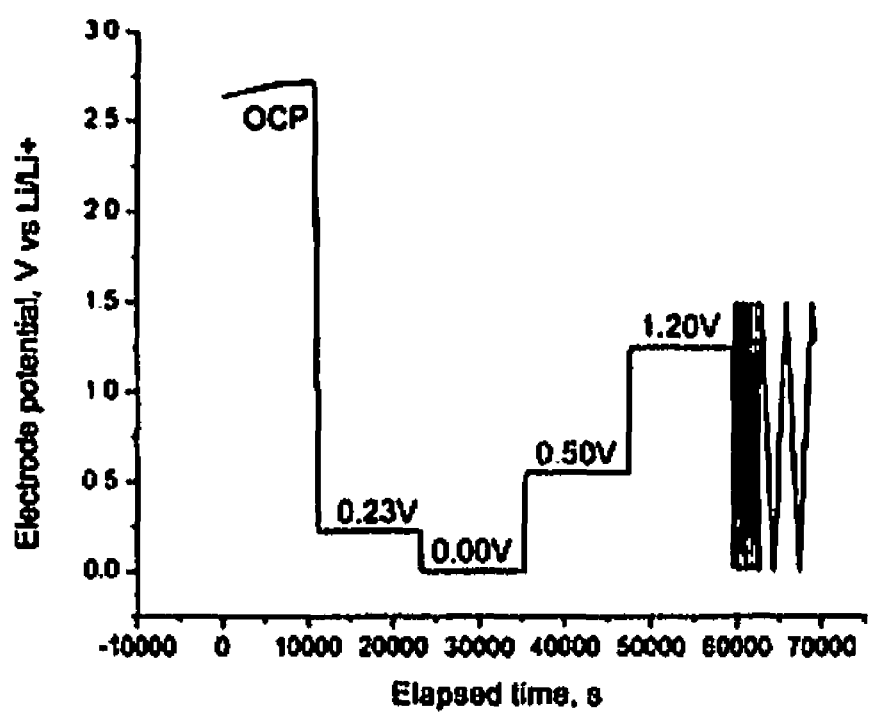
Figure 15B:
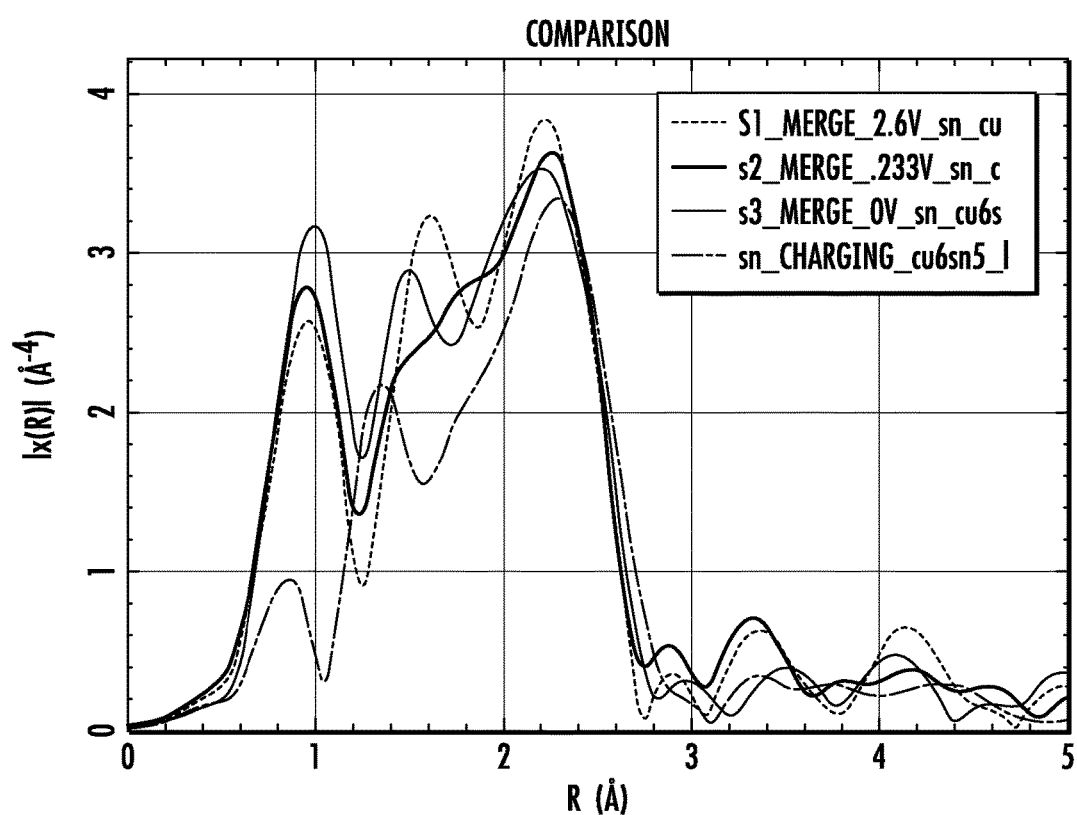

FIGS. 15A and 15B illustrate the in-situ coin cell tests for electrode potential control and XAFS signal change with applied potential in R-space, respectively, according to the examples.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations. Each numerical parameter should at least be construed in light of the number of reported significant digits and by applying ordinary rounding techniques. The term "about" when used before a numerical designation, e.g., temperature, time, amount, and concentration, including range, indicates approximations which may vary by (+) or (−) 10%, 5% or 1%.

As used herein, "Wh/l" is defined as watt-hours per liter.

As used herein, the term "nanoelectrofuels" encompasses flowing electroactive or redox materials. The term encompass electroactive or redox nanoparticles which are self-suspended or dispersed in a fluid or solvent. The fluid can be an electrolyte solution (e.g., a base polar fluid with dissolved ionic salt).

As used herein, the term "electroactive" includes a material that is configured to donate or receive an electron, and it may refer to a cathodic or anodic material.

As used herein, the term "conductive" includes a material that is configured to conduct electrical current.

In various aspects, the invention provides liquid/flowing redox materials and devices, specifically high energy density nanoelectrofuel compositions and nanoelectrofuel battery devices. The battery design as well as methods of preparing the nanoelectrofuel and methods of using them are also provided.

Nanoelectrofuel Compositions

In one aspect, a nanoelectrofuel composition is provided. In one embodiment, the nanoelectrofuel composition is a nanoelectrofuel, nanoelectrofluid or a nanofluid for use in redox flow cell devices. The nanoelectrofuel composition includes a plurality of electroactive nanoparticles. The electroactive nanoparticles, i.e. redox nanoparticles are configured to donate or receive an electron. In some embodiments, the electroactive nanoparticles are dispersed in an electrolyte. In other embodiments, the electroactive nanoparticles are self-suspended. In some embodiments, the electroactive nanoparticles are surface-treated or surface modified.

In some embodiments the nanoelectrofuel has no base electrolyte and includes self-suspended surface modified electroactive nanoparticles mixed with ionic salt and the mixture exhibits fluid behavior i.e. ability to flow. Such solventless nanoelectrofuels are also encompassed by the present technology. For example, a mixture of surface modified electroactive nanoparticles and an ionic salt that has a fluid behavior is a solventless nanoelectrofuel since no additional solvent is used. Use of solventless nanoelectrofuels allows high concentrations of redox nanoparticles, increasing the energy density of the rechargeable nanoelectrofuel.

The nanoparticles may be selected from a variety of redox materials. In some embodiments, the nanoparticles include, a metal, an intermetallic, a metal oxide, a mixed metal oxide, a metal phosphate, a metal alloy or a carbonaceous material. Examples of suitable redox materials include but are not limited to metals, e.g., intercalating elements (A) such as Li, Na, Mg, Sn, Ca, Zn, Al, Si, Ge, and B, or transition metals (M, $M_1$, $M_2$) such as Y, Zr, Mn, Fe, Co, Ni, Cu, Zn, Ag, In, Sn, Sb, Bi, La, Ce, Mg, Sr, Ba, Ca, Ti, V, Al, Si, Hf, Nb, Ta, Cr, V, W and Mo, $A_yMO_x$ compounds, $A_yM_1M_2O_x$ compounds, metal phosphates and mixed metal phosphates $A_yMPO_4$ and $A_yM_1M_2PO_4$, wherein M, $M_1$, and $M_2$ have an oxidation state of +1, +2, +3, +4, +5, +6, or +7 and x and y refer to mole % such that y is from 0 to 2 and x is from 2 to 4, including fully or partially fluorinated derivatives thereof, alloys thereof, and combinations of any two or more thereof. In some embodiments, the nanoparticles include an intermetallic or intermetallic alloy such as, but not limited to, $Cu_6Sn_5$, $Co_2Sn$, $Ni_3Sn_4$, InSn, FeAl, $Fe_3Al$, NiAl, FeCoV, and mixtures of any two or more thereof a metal oxide such as, but not limited to FeOx, MgO, NiOx, SrOx, ZnOx, $TiO_2$, $CeO_2$, $V_xO_y$, $ZrO_x$, $SnO_x$, $SiO_x$, $Ag_2O$, $W_xO_y$, $Fe_xO_y$, $Mn_xO_y$, $Co_xO_y$, $Cr_xO_y$, $Mo_xO_y$, and mixtures of any two or more thereof. In some embodiments, the nanoparticles include a carbonaceous materials such as, but not limited to, fullerenes, fullerites, graphite, graphene, multi-layered graphene sheets, grapheme nanoribbons, carbon nanotubes, activated carbon, carbon composites with transitional metal oxides, Si, Sn, Bi, Ge, intermetallic alloys such as $Cu_6Sn_5$, and combinations of any two or more thereof. The solid electroactive nanoparticles provide for increased volume concentrations of the electroactive material in the liquid redox material, thereby dramatically increasing the energy density compared to traditional salt-based (solubility limited) redox electrolytes. In some instances use of dispersed nanoparticle allows use of electroactive compounds with low solubility.

Suitable electrolytes for use in the nanoelectrofuel compositions include a wide variety of electrolytes. The electrolyte solutions have a desirable fluidity, transport properties, electrochemical stability, and appropriate temperature range for operation and safety. Suitable electrolytes include those which favor ionic conductivity in the electrolyte and have a suitable dielectric constant and viscosity. Electrolytes which allow for the diffusion of ions from one electrode to another include ionic salts of intercalating ion dissolved in polar solvents (e.g., aprotic organic, ionic liquids or protic solvents, such as water or alcohol) can be utilized in the present technology. Exemplary electrolytes include variety of carbonate esters, including cyclic, chlorinated and fluorinated; and variety of substituted sulfolanes, dialkyl esters, organic and inorganic ionic liquids and organic modified metal salts.

In some embodiments, the electrolyte includes aqueous solutions of a salt. In some embodiments, the salt is an ionic salt of intercalating ion. In other embodiments, the electrolyte includes non-aqueous solutions of ionic salts with corresponding intercalating ion, In some embodiments, the electrolyte includes a salt and a polar aprotic solvent. Any electrolytic salts used for the conventional non-aqueous electrolytic solutions can be used.

Illustrative salts for use in any of the electrolytes include, but are not limited to Lewis acid complex salts, such as e.g. $LiBF_4$, $LiAsF_6$, $LiPF_6$ and $LiSbF_6$; sulfonic acid electrolytic salts, such as e.g. $LiCF_3SO_3$, $LiN(CF_3SO_2)_2$, $LiC(CF_3SO_2)_3$, $LiC(CH_3)(CF_3SO_2)_2$, $LiCH(CF_3SO_2)_2$, $LiCH_2(CF_3SO_2)$, $LiC_2F_5SO_3$, $LiN(C_2F_5SO_2)_2$, $LiB(CF_3SO_2)_2$ and $LiO(CF_3SO_2)$, and other electrolytic salts such as e.g. $LiClO_4$, $LiCF_3CO_3$, $NaClO_3$, $NaBF_4$, NaSCN, $KBF_4$, $Mg(ClO_4)_2$, $Mg(BF_4)_2$, $Li[B(C_2O_4)_2]$, $Li[BF_2(C_2O_4)]$, $Li[PF_2(C_2O_4)_2]$, $LiClO_4$, $LiBF_4$, $LiAsF_6$, $LiPF_6$, $LiCF_3SO_3$, $Li(CF_3SO_2)2N$, $Li(CF_3SO_2)_3C$, $LiN(SO_2C_2F_5)_2$, or a lithium alkyl fluorophosphates.

Suitable non-aqueous solvents include, but are not limited to, organic ester solvents comprising dialkyl carbonic acid esters (carbonates) selected from, but not limited to, dimethyl carbonate (DMC), diethyl carbonate (DEC), dipropyl carbonate (DPC), ethylmethyl carbonate (EMC), methylpropyl carbonate (MPC), and ethylpropyl carbonate (EPC), and/or linear alkyl esters selected from, but not limited to, methyl acetate (MA), ethyl acetate (EA), propyl acetate (PA), isopropyl acetate (i-PA), butyl acetate (BA), methyl formate, ethyl formate, methyl propionate (MP), ethyl propionate (EP), propyl propionate (PP), isopropyl propionate (i-PP), methyl butyrate (MB), ethyl butyrate (EB), propyl butyrate (PB), isopropyl butyrate (i-PB), and mixtures thereof, and at least one cyclic ester selected from propylene carbonate (PC), ethylene carbonate (EC), butylene carbonate (BC) and vinylene carbonate (VC), γ-butyrolactone (γ-BL), or cyclic amides such as N-methylpyrrolidinone (NMP), or other solvents such as acetonitrile, benzonitrile, dimethylformamide, diethylformamide, sulfolane, dimethylsulfone, tetramethyl sulfone, diethylether, dimethoxyethane, tetrahydrofuran, dioxane, and the like and mixtures of any two or more such solvents. In some embodiments, the electrolyte is a polar aprotic solvent such as to ethylene carbonate, dimethyl carbonate, diethyl carbonate, ethylmethyl carbonate, dipropyl carbonate, propylene carbonate, vinylene carbonate, methyl butyrate, γ-butyrolactone, N-methylpyrrolidinone, or a mixture of any two or more thereof.

For aqueous electrolytes, any suitable water soluble electrolyte salt can be used to form the electrolyte solution. Suitable water soluble electrolyte salts of intercalating ion include salts of Group Ia, Group IIa, transition metals, and mixtures thereof. Examples of suitable intercalating cations include, but are not limited to lithium, sodium, potassium, hydrogen, magnesium, aluminum and calcium. In some embodiments, the water soluble salts are selected from the group consisting of chlorides (e.g. LiCl, NaCl, KCl, $CaCl_2$, $MgCl_2$, and $NH_4Cl$); perchlorates (e.g. $LiClO_4$, $NaClO_4$, $KClO_4$, $NH_4ClO_4$, $Ca(ClO_4)_2$, and $Mg(ClO_4)_2$), phosphates (e.g. $Na_2HPO_4$, $NaH_2PO_4$, $KH_2PO_4$, $K_2HPO_4$, $Li_2HPO_4$, and $Li_3PO_4$); sulphates (e.g. $Li_2SO_4$, $Na_2SO_4$, $K_2SO_4$, and $(NH_4)_2SO_4$); nitrates (e.g. $LiNO_3$, $NaNO_3$, $KNO_3$, $NH_4NO_3$, and $KNO_2$); and mixtures of any two or more thereof.

In some embodiments, electrolytes include ionic liquids, i.e. organic or inorganic salts in liquid state. Ionic liquids have great appeal because they can be in liquid state in wide range of temperatures between −30° C. and 200° C., evaporate at much lower rates than water or other solvents, increasing nanoelectrofuel battery life. Further, ionic liquids have an electrochemical window of up to six volts (versus 1.23 for water) supporting more energy-dense redox nanomaterials. Redox nanoparticles modified with organic ionic liquids can behave as a self-suspended nanoelectrofuels and exhibit liquid behaviors. Such self-suspended nanoelectrofuels mixed with the salt of intercalating ions can be used as a standalone nanoelectrofuel or can be diluted with another solvent such as excess of the same ionic liquid or mixture of different ionic fluids, or water, or alcohol, or ethylene glycol, propylene glycol, glycerin, or mixtures of thereof, or organic solvents. Such dilution of solventless nanoelectrofuel with other solvent would reduce viscosity of nanoelectrofuel which is desirable, but also would decrease specific energy density. The optimized viscosity/energy density is desirable for efficient operation of flow battery with nanoelectrofuels.

Examples of ionic salts liquid at room temperature that can be used as battery electrolytes include, but are not limited to organic cations such as ammonium, imidazolium and pyrrolidinium that include bulky, asymmetrical organic groups which interfere with the salt's ability to form stable crystal lattices (e.g. 1-ethyl-3-methylimidazolium hydrogen sulphate ($EMIHSO_4$)) and organic anions that include nitrates, dihydrogen phosphates, and sulphonates.

Most pure ionic liquids don't form solid electrolyte interface layer (SEI) at the electrodes that limits the ion transport thus providing better transport properties for ions intercalating from solution and electrons transferred to/from the current collectors.

The electrolyte salt is present in the electrolyte solution, either aqueous or non-aqueous, at a concentration of about 0.001 M to about 100 M. This includes concentrations of about 0.05 M to about 75 M, about 0.01 M to about 50 M, about 0.1 M to about 10 M, about 1 M to about 5 M.

According to one embodiment, the electroactive nanoparticles are surface-treated or surface-modified. The surface treatment or modification allows for stabilization of nanoparticle surface for electrical conductivity and provides long term suspension stability by allowing the nanoparticles to remain suspended or dispersed in the fluid or electrolyte, without exhibiting substantial agglomeration. In some embodiments, the surface treatment renders the nanoparticles conductive, e.g., electrically conductive, or increases the conductance of already conductive nanoparticles. Accordingly, the nanoparticles may be surface-treated or surface-modified with one or more organic groups such as a surface anchor, a polymer, an electron conductor, an ion conductor, or a dispersant. Examples of a surface anchor include, but are not limited to, a silane, a phosphate, a carboxylate, or a thiol, which are used independently or as substituents on an organic molecule, such as e.g., an alkyl silane, an alkylthiol, and the like.

In some embodiments, the nanoparticles are surface-modified with a polymer. In some embodiments, nanoparticles which are surface-modified with a polymer encompass Van der Waals forces, covalent bonds, electrostatic bonds, adsorption, and encapsulation. Examples of suitable polymers include, but are not limited to, a polyalkylene, a polyacetylene, a polyaniline, a polypyrrole, a polythiophene, a polyphenylene, a poly(p-phenylene vinylene), or a hybrid polymers with an incorporated redox species. In some embodiments, the hybrid polymers are composed from the fragments of acetylene, aniline, pyrrole, thiophene, and phenylene-vinylene oligomers. In some embodiments, redox species can be incorporated into the hybrid polymers. In some embodiments the hybrid polymer is poly(3,4-ethylenedioxythiophene) poly(styrenesulfonate) (PEDOT:PSS). Examples of suitable ion conductors used for surface treatment include, but are not limited to a polyethylene oxide, a polythiophene, a polystyrene sulfonate, mixtures thereof or a single ion conductor. Examples of dispersants used for surface treatment include, but are not limited to a carbonate, a polyketone, or a polyacrylate, or an organic cation or anion having an extended alkyl chain (e.g., Cn, n>8) that provides steric isolation of individual nanoparticles preventing their agglomeration. In some embodiments, the dispersant includes a $C_8$-$C_{40}$ alkyl group having at least one anionic or cationic substituent. Examples of anionic and cationic groups include, but are not limited to, ammonium, phosphonium, carboxylate, phosphate, sulfonate, and the like. The modifying agent can be in the form of a polymer or oligomer, or individual organic molecule or individual organic ion (cation or anion).

In some embodiments, the nanoparticles have small particle sizes (e.g., an average particle size of less than about 1000 nm). In some embodiments, the average particle diameter of the nanoparticle may be less than about 250 nm, less than about 150 nm, less than about 100 nm, less than about 75 nm, or less than about 50 nm. In some embodiments, the nanoparticles have an average particle diameter of less than about 30 nm, less than about 20 nm, or less than about 10 nm. In some embodiments, the nanoparticles have an average diameter of about 1 nm to about 100 nm. In some embodiments, the nanoparticles have an average diameter of about 50 nm to about 100 nm. In some embodiments, the nanoparticles have an average diameter of about 1 nm to about 50 nm. In some embodiments, the nanoparticles have an average diameter of less than 50 nm. In some embodiments, the nanoparticles have one or more dimensions of less than 100 nm As used herein, the self-healing crystal threshold is the size above which a particle, during intercalation or de-intercalation, irreversibly damages the crystalline lattice into which it is intercaling or de-intercalaing. By having a size below the self-healing crystal threshold, this allows for the crystalline structure to recover over multiple charge/discharge cycles and/or ion intercalation/deintercalation cycles to provide for extended life of a battery incorporating the electroactive nanoparticles.

The nanoparticle suspensions, i.e. nanoelectrofuels, may have a significantly higher stability than micron-sized suspension due to a relative balance of Brownian motion and gravity forces. Accordingly, such nanoelectrofuels are significantly more stable with respect to settling. The nanoelectrofuel compositions may be prepared with high solid loading at manageable viscosity increase. In some embodiments, the nanoelectrofuel compositions have a solid nanoparticle loading of about 10 vol. %, 15 vol. %, 20 vol. %, about 25 vol. %, about 30 vol. %, about 35 vol. %, about 40 vol. %, about 45 vol. %, about 50 vol. %, about 55 vol. %, about 60 vol. %, about 65 vol. %, about 70 vol. %, about 75 vol. %, about 80 vol. %, about 85 vol. %, about 90 vol. % or about 95 vol. %.

In some embodiments, the nanoelectrofuel compositions include about 60% solids. In some embodiments, the nanoelectrofuel composition includes from about 10 to about 60% by volume nanoparticles. In some such embodiments, the nanoelectrofuel provides up to 1100 Wh/l volumetric energy density. In some embodiments, the nanoparticle concentration can be increase to up to about 80 vol. % while still exhibiting fluid behavior. In some such embodiments, the nanoelectrofuel provides up to 1500 Wh/l volumetric energy density. This type of nanoelectrofuel is solventless nanoelectrofuel and is represented by a mixture of surface modified nanoparticles and ionic salts of intercalating ions without use of additional solvent. The surface modification of cathode and anode nanomaterials allows for ionic and electronic conductivity at the surface of nanoparticles, while still supporting steric stabilization that prevents particle agglomeration and also provides low shearing of nanoparticles in the flow. Such solventless liquid nanoelectrofuels which include up to about 80 vol. % of solids mixed with ionic salts and are still able to flow and maintain chemical stability in wide temperature range can be used in redox flow cell as rechargeable electrochemical fuel.

The nanoelectrofuel may be a composite of a nanosized solid cathode or anode particles in a matrix of a liquid electrolyte at concentrations up to 60 vol. % of solids. The nanoelectrofuel may be stored in charged or discharged form separate from the electrochemical device. In some embodiments, each of the two nanoelectrofuels required for flow battery operation can be in reduced or oxidized state. For example, in the battery discharge mode the first nanoelectrofuel is in an oxidized state i.e. it is a cathodic fluid, and it is configured for receiving an electron. During discharge mode, the second nanoelectrofuel is in reduced state, i.e. it is an anodic fluid, and it is configured for donating an electron. During the battery discharge each nanoelectrofuel undergoes redox reaction at an electrochemically inert conductive current collector (i.e. reduction of cathodic fluid and oxidation of the anodic fluid).

The difference between electrochemical potentials for cathodic and anodic reactions defines the cell potential. In battery charge mode nanoeletrofuels undergo a reverse electrochemical reaction under application of the external electric current. Therefore the nanoelectrofuel that was cathodic on discharge is oxidized and the fluid that was anodic on discharge is reduced. In some embodiments, the cathodic and anodic nanoelectrofuel is used for electrical energy storage, in combination with an electrochemical flow device. Electrical energy is stored in redox nanoparticles included in the nanoelectrofuel. Under steady state rest conditions, the cathodic and anodic nanoelectrofuels are stored in two separate cell bodies which are separated by ion conducting, but electron insulating membrane. The spontaneous electrochemical reaction of the battery discharge only occurs when there is a path for electrons to flow from first half-cell cell body to the second half-cell cell body (closed circuit). Therefore nanoelectrofuels can not be discharged without a closed circuit and the second half reaction. Once the circuit is closed, the electrons start flowing from anode cell body to cathode cell body through the circuit, while ions are flowing through the ion-conductive membrane for compensation of charge created at cathode. When the cathodic and anodic nanoelectrofuels flow through an electrochemical cell at closed circuit, electron movement from anodic to cathodic material is effected and an electrical current is generated. The energy of the electrons that leave the anode is higher than the energy of electrons delivered at the cathode, therefore the work is done. Under steady state rest conditions, the chambers each containing the nanoelectrofuels (one cathodic and the other anodic) are in charge balance across an ion-exchange membrane whose net charge difference is zero. When work is done to, or by, the cell the excess electrons from one chamber are dislocated by an external circuit via a conductive path, creating a net gain or loss of charge between the chambers. The chemical potential difference of the anodic and cathodic nanofuel, separated by the membrane, sets up an electromotive force (EMF) which drives ions into the adjacent chamber to compensate whatever ionic depletion was incurred from the resulting work done to or by the external circuit.

The nanoelectrofuel and electrolytes provide for the existence of an electric double layer at the solid/liquid interface of the nanoparticles and electrolyte. Thus, the surface of the nanoparticle may be positively charged, while the fluid in contact with the nanoparticle has a negative charge, or the surface of the nanoparticle may be negatively charged, while the fluid in contact with the nanoparticle has a positive charge. The high surface area-to-volume ratio of nanoparticles allows for capacitive energy storage in the nanoparticles suspended in the fluid. Because of the small separation distances between charges at the solid/liquid interface, electric double layers have a capacity measuring tens of microfarads per square centimeter of true surface area of the electrode, which (at an average nanoparticle surface area of 100 $m^2/g$) in nanoelectrofuels, would produce an average capacitance of 10 F per gram of solid. This type of energy storage provides an additional capacity of about 5-10% to the redox storage capacity of the bulk nanoparticles. Thus surface modification of redox nanoparticles can be engineered to create higher surface charges and consequently nanoelectrofuel compositions with higher specific energy densities.

Exemplary chemistries for rechargeable nanoelectrofuel electrical energy storage device included are presented in Table 1 below. In one embodiment, the nanoelectrofuel flow battery includes two one cathodic and one anodic nanoelectrofuel. An intercalating ion is selected from those listed in column 1 of the table, and then the chemistries for the battery can be combined by combining one of the proposed electrolyte composition (solvent+ionic salt) and one of the cathode nanoparticles for cathodic nanoelectrofuel and one of the electrolyte and anodic nanoparticle compositions for anodic nanoelectrofuel. Each electrode chemistry has an established half-cell redox potential for the redox reaction that is accompanied by Li intercalation/deintercalation. The difference between the cathodic and anodic half-cell reaction potentials for the two selected nanoelectrofuels will define the battery voltage. Higher cell voltage provides higher specific energy density.

TABLE 1

Chemistries for Rechargeable Nanoelectrofuel

| Intercalating Ion | Liquid electrolyte | Cathode Nanoparticles | Anode Nanoparticles |
|---|---|---|---|
| Non-aqueous chemistries Li+ | Mixture of carbonates EC, DEC, DMC, EMC, DPC, MB, BL, NMP, vinylene carbonate, etc. With Li-ion salt, $LiPF_6$, $LiN(SO_2CF_3)$, LiBOB and other | Metal oxides $LiyV_3O_8$ $LiyCoO_2$ $LiyMnO_2$ $LiFeNiPO_4$ $LiFePO_4$ $LiNiMnO_4$ $LiNiCrMnO_4$ Gaseous: Oxygen/Air | Intermetallic ($Cu_6Sn_5$, $Co_4Sn_3$, $Ni_4Sn_3$, etc.) Carbonaceous $LixC_6$ Metal Oxides $Li_4Ti_5O_{12}$, $LiTiNiO_4$, $Li_2Mn_2O_4$ Sulfides $LiTiS_2$, $LiMoS_2$, $LiFeS_2$, $LiVCrS_2$ |

TABLE 1-continued

Chemistries for Rechargeable Nanoelectrofuel

| Intercalating Ion | Liquid electrolyte | Cathode Nanoparticles | Anode Nanoparticles |
|---|---|---|---|
| Aqueous chemistries Li+ | LiCl, Li$_2$SO$_4$, LiClO$_4$, LiOH | LiMnO$_2$ LiNiPO$_4$ | LiTiO$_2$, LiVO$_2$(B) LiTi$_2$(PO$_4$)$_3$, LiV$_2$O$_5$, Polypyrrole |
| Aqueous chemistries Na+ | Na$_2$SO$_4$ | Na$_{4.4}$MnO$_2$ CuHCF, NiHCF | NaTi$_2$(PO$_4$)$_3$ FeF$_3$ |

In another embodiment, the nanoelectrofuel composition may be a composite of a nanosized solid anode particles in a matrix of a liquid electrolyte at concentrations up to 60 vol. % of solids. In such embodiments, the cathode may be positive air electrode, thus a cathodic nanoelectrofuel is not needed in such air battery configurations.

The nanoelectrofuel compositions exhibit high stability owing to the nanoscale particle size and the surface-treatment. The nanoelectrofuel compositions have nanoparticles which are in constant Brownian motion and which do not agglomerate. It is contemplated that the stable nanoelectrofuel compositions of nanoparticles in liquid matrix are achieved due to small particle sizes and significant random motion, i.e. Brownian motion of nanoparticles which counterbalances the gravity forces. To achieve long term stability and shelf life of nanoelectrofuels, agglomeration of nanoparticles needs to be prevented. Agglomerated nanoparticles move together as one unit, incurring lesser Brownian motion and stronger gravity force, therefore they become more susceptible for precipitation thereby resulting in larger effective sizes. Shelf life of the nanoelectrofuels depends, in part, on the ratio of densities of nanoparticle material and electrolyte and the size of nanoparticles. Smaller particle sizes provide longer shelf life and longer lifecycle for the rechargeable battery.

The settling velocity of nanoparticles ($V_s$) can be roughly estimated from Stokes law (which only accounts for gravitational and buoyant forces):

$$V_s = \frac{2}{9}\left(\frac{\rho_p - \rho_0}{\mu}\right)r^2 g,$$

where g is the gravitational acceleration. As is evident from the equation, the stability of a suspension (defined by lower settling rates) improves if: (a) the density of the solid material ($\rho_p$) is close to that of the fluid ($\rho_0$); (b) the viscosity of the suspension ($\mu$) is high, and (c) the particle radius (r) is small. Critical particle size for the given system and desired settling velocity (e.g. 1 cm/year) can be calculated as well.

In some embodiments, the surface treatment of nanoparticles prevents agglomeration of nanoparticles and improves miscibility of nanoparticles with the liquid electrolyte. In some embodiments, the surface treatment of electrode nanoparticles provides improved suspension stability, facilitation of electron transfer, permissivity to intercalating ions, e.g. H$^+$, Li$^+$, Na$^+$, K$^+$, Mg$^{2+}$, Al$^{3+}$, and electrochemical stability over a wide range of potentials. Suitable surface treatment reagents are described herein, and include co-polymer coatings having groups with one or more functionalities such as nanoparticle surface anchor, electron conductor, ion conductor, and dispersant (miscible with base fluid). Exemplary co-polymers also include those having dual or multiple functionality, e.g., polythiophenes, which can serve all four functions mentioned above for metallic/intermetallic nanoparticles. Other agents useful for surface modification of nanomaterials include, for example, polymers and co-polymers with low molecular mass (e.g. M<5000 g/mol).

In some embodiments, cathode and anode redox materials in the form of nanoparticles are used to prepare the nanoelectrofuel electrolyte. In some embodiments, anode materials used include different Li alloys, e.g., Li$_x$M, where M could be B, C, Al, Bi, Sn, Si, Sb and Ga. Exemplary anode materials include e.g., forms of carbon (LiC$_6$; theoretical capacity 372 mAh/g), Sn (Li$_{4.4}$Sn; theoretical capacity 991 mA/h) and its intermetallic compounds, and Si (Li$_x$Si; theoretical capacity 4200 mAh/g). In some embodiments, the formulation of nanoelectrofuel involves synthesis of nanomaterials, surface modification with conductive materials and dispersion in the base electrolyte.

A single nanoelectrofuel can be utilized in a half-flow-cell configuration i.e., either anode or the cathode is liquid and another electrode is solid or gaseous, or it can be utilized in a flow cell with two nanoelectrofuels i.e. both cathode and anode.

The nanoelectrofuels can be water based or solvent based systems. Water based systems offer the ease of handling and testing but have low cell voltage limit and therefore low energy density. Other nanoelectrofuel systems include high energy density formulations such as e.g. Li$^+$ ion based Cu$_6$Sn$_5$, Ni$_3$Sn$_4$, Co$_2$Sn nanoelectrofuels.

The exact formulation for surface-treatment or surface-modification will depend on the type of the nanoparticles (e.g. metal oxides, metallic/intermetallic, or carbonaceous), type of the liquid electrolyte (e.g. organic solvents or water based), and the type of intercalating ion. Exemplary variations and combinations of functional co-polymer fragments for nanoparticle surface treatment are summarized in Table 2.

TABLE 2

Selection of polymer and co-polymer fragments for nanoparticle surface modifications

| Nanoparticles | Electrolyte | Anchor | Electron conductor | Ion Conductor | Dispersant |
|---|---|---|---|---|---|
| Metal Oxides/phosphates Metal/ intermetallic Carbonaceous | Li-ion aprotic electrolyte Mixture of carbonates EC, DEC, DMC, EMC, DPC, MB, BL, NMP, vinylene carbonate, etc. Li-ion salt, LiPF6, $LiN(SO_2CF_3)$, LiBOB. | Silanes phosphates Thiols Carboxylic Phosphates Silanes Thiols | Polyacetylenes Polyanilines polypyrroles polythiophenes polyphenylenes substituted Poly(p-phenylene vinylenes), hybrid polymers with incorporated redox species | Polyethylene oxide, Polythiophenes, Polystyrene sulfonate, Single ion conductors covalent linking of e.g. $LiN(SO_2CF_3)$ | Carbonate polyketones |
| Metal oxides | Water or protic based electrolyte (water mixture with glycols) Li+, Na+, H+, $Li^+$, $Na^+$, $Mg^{2+}$, $Al^{3+}$ salts. | pH, electrolyte concentration can be used along with polymeric surface treatments | | | |

Once the nanoparticles for cathodic and anodic nanoelectrofuels are selected (examples provided in Table 1), Table 2 is used for selecting the appropriate surface treatment for nanoparticles. The redox nanoparticles belong to one of the three major groups (metallic, metal oxides/phosphates or carbonaceous) and will be dispersed either in organic aprotic electrolyte or water or protic based electrolyte for the given examples. Anchor group specific for the given nanoparticle surface can be attached to the nanoparticle surface in a separate surface treatment step or being introduced as a part of the larger polymeric/oligomeric molecule. Example for such case is thiol groups can be introduced to the surface of metallic nanoparticles as a treatment with individual mercapto-group containing compounds (ionic liquids), followed by introduction of additional functionalities to the surface; or in form of polythiolphenylenes, that exhibit all the required characteristics in one formula (anchor, electron & ion conductor, dispersant). In some cases different functionalities can be exhibited by the same surface modification agent. For the case of water-based nanoelectrofuels a combination of organic/polymeric treatment similar to suggested for organic solvents, but also miscible with water can be combined with electrostatic stabilization of nanoelectrofuels. Skilled in art can adjust the surface modification procedure for the given nanoparticle composition and solvent chemistry using Table 2.

In some embodiments solventless nanoelectrofuels exhibiting liquid behaviors can be prepared. Solventless nanoelectrofuels are essentially self-suspended nanoparticle liquids, and are represented by solid inorganic core functionalized with covalently attached ionic liquid molecules and mixed with salt of intercalating ion ($2^{nd}$ column in Table 2). Solventless nanoelectrofuels are engineered to display properties of free flowing liquids by selecting low-shear organic ions. Nanoparticles are electroactive nanomaterials capable of storing charge through redox reaction and intercalation of ions, cathode and anode nanomaterials could be selected from materials presented in Table 1. Solventless nanoelectrofuels allow high concentration of electroactive materials (up to 80 vol. % depending on particle size), while able to flow as liquids and able to electrochemical reaction between current collectors and nanoparticles accompanied by ion intercalation into nanoparticles. Solventless nanoelectrofuels can be engineered so they are liquids at as low as −25° C. and thermally stable up to 200° C.

In some embodiments, a method for preparing self-suspended solventless nanoelectrofuels is provided. The method includes first anchoring organic cation such as e.g., mercapto-alkyl-ammonium salt or mercapto-imidazolium salt, or mercapto-phosphonium salt, mercapto-pyrrolidonium salt to the metallic nanoparticles in a suitable solvent e.g., tetrahydrofuran. Organic cations can have additional functionalities incorporated, such as electronic or ionic conductivity, low shear alkyl tail, etc. To achieve liquid-like behavior of solventless nanofluids sulfonate-based ionic liquid (organic anion) can be added to the nanoparticles in ~1:1 molar ratio with the first type of organic cation. In some embodiments an organic anion can be anchored to the nanoparticles and later mixed with organic cation to form a flowable self-suspended nanofluid. Further the solvent is evaporated and remaining nanoparticles are self-suspended. Chemistry of organic groups can be optimized to achieve high rates of electron and ion transfers for given nanoparticle chemistry.

In another aspect, a method for preparing a nanoelectrofuel composition is provided, which includes contacting redox nanoparticles with a surface-modifying agent; and dispersing the surface-modified nanoparticles in an electrolyte to provide a stable nanoparticle suspension.

Suitable methods for surface modification of nanoparticles are known in the art and can be utilized herein. In some embodiments, the surface modification procedure includes measuring and dissolving a suitable amount of selected surface-modifying agent in a first solvent, and optionally diluting the solution using a second solvent and then adding the suspension of nanoparticles in first of the second solvent to the solution. The suspension of nanoparticles so obtained may be agitated using conventional methods or sonicated in an ultrasound bath for a suitable period of time. After a suitable period of time when the process is deemed complete the nanoparticles are separated from reaction mixture by methods such as centrifuging and dispersed into the electrolyte solution. In some embodiments, the dispersing includes sonicating or high-impact ball milling of the surface-modified nanoparticles in the electrolyte. In some embodiments, the method includes high power ultrasound agitation and/or stirring. In some embodiments, the method includes high impact ball milling. In some embodiments, the method includes removing the excess solvent to prepare nanoelectrofuels having self-suspended nanoparticles. The excess solvent may be removed using suitable methods known in the art e.g. vacuum drying. This process provides a stable high-energy density nanoelectrofuel compositions.

Suitable surface-modifying agents are described herein. In some embodiments, the surface-modifying agents include polymers, co-polymers or oligopolymer mixture (e.g. PEDOT:PSS). In some embodiments, surface polymerization of polymer precursors can be achieved through anionic or cationic polymerization. In some embodiments surface modification of nanoparticles can be achieved by anchoring organic cations and anions. In some embodiments, the surface modification can be conducted in gaseous phase on dry nanoparticle powders.

For the methods of surface modification described above, the amount of solid nanoparticles may be in the range of about 0.01 to about 50 wt %. This includes from about 0.05 to about 20 wt %, from about 0.1 to about 10 wt %, from about 1 to about 10 wt %, or from about 2 to about 5 wt %. In one embodiment, the concentration of nanoparticles for the surface treatment is about 1 wt %, i.e. ~10 g/L.

The solvents used in the methods will depend on the surface-modifying agent being used. Suitable solvents include, but are not limited to, an alcohol, e.g., methanol, ethanol, isopropyl alcohol, 1-propanol, 1-butanol, 2-butanol, a ketone, e.g., acetone, ethyl methyl ketone, methyl isobutyl ketone, a hydrocarbon, e.g., toluene, xylene, hexanes, heptanes, cyclohexane, a halogenated hydrocarbon, e.g., dichloromethane, ethylene dichloride, chloroform, an ester, e.g., ethyl acetate, n-propyl acetate, n-butyl acetate, t-butyl acetate, an ether, e.g., diethyl ether, diisopropyl ether, methyl t-butyl ether, tetrahydrofuran, dioxane, a polar aprotic solvent, e.g., N,N-dimethylformamide, N,N-dimethylacetamide, dimethylsulfoxide, sulfolane, N-methylpyrrolidone, a nitrile, e.g., acetonitrile, propionitrile, water; or mixtures thereof.

Suitable temperatures for the method, i.e., the contacting or the dispersing step are less than about 150° C., less than about 80° C., less than about 60° C., less than about 40° C., less than about 20° C., less than about 0° C., or any other suitable temperatures. Suitable contacting or dispersing times depend on the temperature and other conditions, and may be less than about 50 hours, less than about 30 hours, less than about 10 hours, less than about 5 hours, less than about 2 hours, less than about 1 hour, or any other suitable times. Longer times may also be suitable.

Relatively low viscosity of the present nanoelectrofuel compositions provides higher energy conversion efficiency and power ratings of the flow battery. Because of nanoscale dimensions of suspended particles in nanoelectrofuels, the volume expansion during ions intercalation/deintercalation does not significantly affect the integrity of the nanoelectrofuel electrode, and doesn't cause the loss of storage capacity. Further, particle size can be selected to be smaller than the crystal self-healing threshold, thus allowing to recover crystalline structure in charge/discharge cycles as volume expands due to ion intercalation.deintercalation. All these factors result in extended life cycle of the nanoelectrofuel electrodes for flow battery. The stable nanoelectrofuel compositions allow for a flow cell design that does not require addition of support or props like carbon nanotubes to prevent agglomeration and settling of electroactive particles. The viscosity of nanoelectrofuels increases with concentration of electroactive nanoparticles and can be in a wide range from few percents to up to 1000 times of that compared to the viscosity of background electrolyte. In some embodiments acceptable viscosity increase for nanoelectrofuel formulations are no more than 100 times of the viscosity of the supporting electrolytes. In some embodiments preferred viscosity of nanoelectrofuels is no more than 10 times of the viscosity of background electrolyte. The viscosity of nanoelectrofuels changes with the temperature and can be in a wide range from 1 cP to up to about 10000 cP. In some embodiments, the viscosity increase for nanoelectrofuel formulations is no more than about 1000 cP. In some embodiments, the viscosity of nanoelectrofuels is no more than 100 cP at room temperature.

The proposed composition for anodic and cathodic nanoelectrofuels can be utilized with any redox flow battery cell design, including parallel plate designs with porous electrodes, designs based on bipolar plates, as well as variety of radial flow cell designs.

Redox Flow Cell

In yet another aspect, a nanoelectrofuel redox flow cell design is provided. The redox flow cell is designed to provide efficient charge and discharge of redox nanomaterials in nanoelectrofuels. The redox flow cell operates with two nanoelectrofuels, that are drawn or forced through the flow cell device to store or extract electrical energy.

The redox flow cell includes a first inlet and a first outlet in fluid communication with a first half-cell body, a second inlet and a second outlet in fluid communication with a second half-cell body, a membrane defining the second half-cell body, and a retaining member configured to secure the second half-cell body within the first half-cell body. In some embodiments, the first half-cell body is at least partially radially disposed around a portion of the second half-cell body. In some embodiments, the first half-cell body is a first battery cell body and the second half-cell body is a second battery cell body. The first half-cell body may contain a first current collector and the second half-cell body may contain a second current collector. The conductive materials can suitably include any conductive material known in the art, in a suitable form or shape, which allows an electrical charge to flow through. In some embodiments, the conductive material is in the from of a "shot" i.e. electrochemically inert conductive material made of a conductive material having a suitable shape and size. In some embodiments, the first current collector includes a first conductive shot, a first conductive fiber, or a first conductive mesh. In some embodiments, the second current collector includes a second conductive shot, a second conductive fiber, or a second conductive mesh. In some embodiments, the first current collector and the second current collector is each an electrochemically inert loose current collector shot material. The shot is loosely packed so that they create a flow-through current collector. In some embodiments, the shots allow the nanoelectrofuel to flow through in either direction, while the shots remain within the device.

The first and the second half-cell body can be made of any suitable non-conductive or conductive material known in the art. In some embodiments, the first half-cell body and/or the second half-cell body is composed of materials including, but not limited to, a polymer, conductive polymer, or a conductive material. Illustrative conductive materials include, but are not limited to, metals such as Y, Zr, Mn, Fe, Co, Ni, Cu, Zn, Ru, Rh, Pd, Ag, In, Sn, Re, Os, Ir, Pt, Au, La, Ce, Mg, Sr, Ba, Ca, Ti, V, Al, Si, Hf, Nb, Ta, and Mo, salts thereof, alloys thereof, and combinations of any two or more thereof; an intermetallic or intermetallic alloy such as, but not limited to, FeAl, $Fe_3Al$, NiAl, $Ni_3Al$, TiAl, CuZn, $CuAl_2$, AN, SiC, $Si_3N_4$, WC, FeCoV, and mixtures of any two or more thereof; a metal oxide such as, but not limited to, BaO, CaO, CuO, FeO, MgO, NiO, SrO, ZnO, $TiO_2$, $CeO_2$, $V_2O_3$, ZnO, $ZrO_2$, $SnO_2$, $SiO_2$, $Ag_2O$, $WO_3$, $Fe_2O_3$, $Mn_2O_3$, $Al_2O_3$, $V_2O_5$, $MoO_3$, and mixtures of any two or more thereof; a metal alloy such as, but not limited to, nickel-based alloys, nickel-based superalloys, cobalt-based alloys, cobalt-based superalloys, and combinations of any two or more thereof; or carbonaceous materials such as, but not limited to, fullerenes, fullerites, graphite, carbon nanotubes, activated carbon, carbon composites, aggregate diamond nanorods, and combinations of any two or more thereof. Illustrative non-conductive materials include soft elastic polymers, plastics, thermoplastics, silicone rubber, or other polymeric material such as polyfluorinated ethylene (PTFE), polyether ether ketone (PEEK), polyarylether ketones (PAEK), polyurethanes and the like. The volume of the first and the second half-cell cell body can be varied to accommodate electrical performance requirements.

In some embodiments, the conductive material functions as a current collector. Suitable conductive materials are known in the art and include, but are not limited to, stainless steel, copper, aluminum, nickel, titanium, sintered carbon, aluminum or stainless steel, or conductive ceramics such as SiC, $MoSi_2$, $LaCr_2O_4$, $In_2O_3$, $SnO_2$, ITO and such which has been surface-treated with carbon, nickel, titanium, copper, silver, or conductive ceramics such as SiC, $MoSi_2$, $LaCr_2O_4$, $In_2O_3$, $SnO_2$, ITO and such. The conductive material or shot may be used in various shapes or forms including, but not limited to, spherical grains, saddles, rings, nuggets, films, sheets, foils, nets, tubes, hollow spheres, porous structures, foams and non-woven fabrics. The conductive shot can have a suitable size depending on the desired packing density and flow. In some embodiments, the first current collector is of a morphology diameter sufficient to provide adequate flow of the nanoelectrofuel through the first chamber. In other embodiments, the second current collector is of a morphology diameter sufficient to provide adequate flow of the nanoelectrofuel through the second chamber. In some embodiments, the conductive materials have an average size of larger than about 50 µm. This may include sizes that are larger than about 200 µm, larger than about 300 µm, larger than about 400 µm, larger than about 500 µm, larger than about 800 µm, or larger than about 1000 µm. In some embodiments, the conductive materials have an average size of from about 0.5 µm to about 5000 µm in one dimension. This may include an average size of from about 300 µm to about 1500 µm, from about 500 µm to about 1000 µm, or from about 700 µm to about 1200 µm. In some embodiments, the conductive shots have a morphological macroscopic diameter and shape of suitable size for the desired packing density and flow. In some embodiments, the conductive current collector shots includes particulates in spherical, cylindrical or tubular shape with dimensions ranging from about 0.5 µm to about 5000 µm.

The first half-cell body may include a cylindrical well orthogonally disposed in relation to a flow path defined by the first inlet and the first outlet, the cylindrical well having a bottom end distal to an open end. The second half-cell body may include a cylindrically shaped body having a first end and a second end, the second end being distal to the first end, and the first end comprising a first seal. The cylindrical well may be integrally formed, or it may be formed by insertion of a well defining member into a cylindrical bore formed in the first half-cell body. In either case, the bottom end, or the well defining member includes a bore for receiving and sealing to the second half-cell body at, or near, the second outlet.

In some embodiments, the retaining member includes a cylindrically-shaped body having a smooth thru hole bore configured to receive the second inlet, and configured to seal against the second inlet or the second half-cell body, and an outer seal configured to seal against the first half-cell body. In some embodiments, the redox flow cell includes a first retaining member and a second retaining member each of which includes a double O-ring seal and groove. In some embodiments, the redox flow cell includes the second retaining member inserted in to the first retaining member which is then slipped into the nonconductive cell body or housing.

In some embodiments, the second half-cell body is configured to be inserted into the cylindrical well of the first half-cell body, the second half-cell body further comprising a first seal configured to engage at or near the bottom end of the cylindrical well, and a second seal configured to engage the retaining member, and the retaining member configured to seal at or near the open end of the cylindrical well, thereby forming a sealed first chamber radially surrounding a second sealed chamber.

In some embodiments, the cylindrically shaped body of the second cell includes a plurality of pillars or columns, extending from the first end to the second end, and radially held in place by O-rings and axially by downward pressure applied by the retaining member. In some embodiments, the cylindrically shaped body of the second cell includes four pillars or columns, extending from the first end to the second end, and held in place by O-rings. The pillars or columns are configured to form the cylindrical shaped body.

In some embodiments, the membrane defining the second half-cell body is wrapped around the pillars or columns to define a cylindrical shaped body of the second half-cell body. Suitable membranes are those which exhibit desirable proton conductivity, high selective ion permeability, long-term chemical stability and good mechanical properties. The membrane can be any suitable ion conductive membranes known in the art and includes, but is not limited to ion exchange membrane such as lithium ion conductive (polyethyleneoxide based polymers or proton conductive (Nafion) polymer membranes; ceramic membranes such as NaSICON-type, LiSICON-type, KSICON type, and β alumina-type ceramic materials, RhinoSkin®.

The nanoelectrofuel utilized in the redox flow cell is described herein. In some embodiments, the first nanoelectrofuel comprises an anodic or a cathodic nanoelectrofuel. In some embodiments, the second nanoelectrofuel comprises the other of the anodic or the cathodic nanoelectrofuel.

In another aspect, a redox flow battery comprising the redox flow cell is provided. The redox flow battery is designed to serve the function of both storage and release of electrochemical energy. Accordingly, in one embodiment, the redox flow battery includes a redox flow cell, a first nanoelectrofuel reservoir in fluid communication with the first inlet or second inlet, and a second nanoelectrofuel reservoir in fluid communication with the other of the first inlet or second inlet. The nanoelectrofuels are circulated through the first and/or the second half-cell body. The circulation may be achieved using suitable means such as a pump. Thus, in one embodiment, the redox flow battery further includes a first pump configured to pump a first nanoelectrofuel from the first nanoelectrofuel reservoir through the first half-cell body, and a second pump configured to pump the second nanoelectrofuel from the second nanoelectrofuel reservoir through the second half-cell body. In some embodiments, both cathodic and anodic nanoelectrofuels can be circulated using the same pump. Accordingly, in one embodiment, the redox flow cell includes a single first pump configured to pump a first nanoelectrofuel from the first nanoelectrofuel reservoir through the first half-cell body, and a second nanoelectrofuel from the second nanoelectrofuel reservoir through the second half-cell body.

In some embodiments, the first nanoelectrofuel comprises an anodic or a cathodic nanoelectrofuel, and the second nanoelectrofuel comprises the other of the anodic or the cathodic nanoelectrofuel. In some embodiments, the redox flow cell further includes a first nanoelectrofuel collection reservoir in fluid communication with the first or second outlet and corresponding to the first nanoelectrofuel reservoir, and a second nanoelectrofuel collection reservoir in fluid communication with the first or second outlet and corresponding to the second nanoelectrofuel reservoir. Inlet and outlet reservoirs for first and the second nanoelectrofuels can be rigidly conformal or plastic in function. In some embodiments, the first and the second nanoelectrofuel reservoirs are soft body reservoirs configured to expand and contract as they are filled or emptied, respectively.

In some embodiments, the first and the second nanoelectrofuels are pumped at different rates by a separate pumps. In some embodiments, first and the second nanoelectrofuels are pumped communally with a single pump. In some embodiment inlet nanoelectrofuel reservoir and outlet nanoelectrofuel reservoir are separate reservoirs. In some embodiments the flow battery has only two nanofluid reservoirs one for cathodic and one for anodic nanoelectrofuels with inlet and outlet fluid mixing. In other embodiment nanoelectrofuel flow battery has four separate nanoelectrofuel reservoirs: inlet reservoirs for cathodic nanoelectrofuel, outlet reservoirs for cathodic nanoelectrofuel, inlet reservoirs for anodic nanoelectrofuel and outlet reservoirs for anodic nanoelectrofuel. In some embodiments, the inlet and outlet reservoirs are made out of non-conductive soft elastic polymers and can change the spatial volume as the fluid gets in and out of it (similar to IV bags), so the total volume of the inlet and outlet reservoirs equals the volume of the nanoelectrofuels independent on the state of the fluid charge. In some embodiments nanoelectrofuel flow battery has an outlet reservoir in fluid communication with the flow cell outlet for each of the first and the second fluids. Nanoelectrofuel inlet and outlet reservoirs can be rigidly conformal or elastic in function. In some embodiments, both cathodic and anodic nanoelectrofuels can be circulated using the same pump. Nanoelectrofuels can be pumped at varying velocities for dynamic control of electrical output and/or for dynamic heat load management.

In some embodiments, the redox flow cell further includes a first nanoelectrofuel reservoir in fluid communication with the first inlet or second inlet, and wherein the second half-cell body is configured as an air electrode. In such embodiments, the first nanoelectrofuel reservoir includes an anodic nanoelectrofuel. In such embodiments, the second body is connected to an air or an oxygen source. In some embodiments, the first and second nanoelectrofuel reservoirs each independently include a nanoelectrofuel inlet. In some embodiments, the first and second nanoelectrofuel collection reservoirs each independently include a nanoelectrofuel outlet. The flow of the nanoelectrofuel is adjusted to accommodate full discharge on either single or multiple passage of the fluid through the battery.

In another aspect, a redox flow battery is provided, which includes a first nanoelectrofuel reservoir in fluid communication with the first inlet or second inlet, and wherein the second half-cell body is configured as an air electrode. In some embodiments, the first nanoelectrofuel reservoir comprises an anodic nanoelectrofuel. The first and second nanoelectrofuel reservoirs each independently comprise a nanoelectrofuel inlet, and the first and second nanoelectrofuel collection reservoirs each independently comprise a nanoelectrofuel outlet.

In some embodiments, the first half-cell body and the second half-cell body are electrically isolated from each other. In some embodiments, the first half-cell body and the second half-cell body are each made of conductive electrochemically inert current collector materials. In some embodiments, the redox flow cell battery further includes circuit valves or terminals positioned suitably to collect the electric current. In some embodiments, the redox flow cell further includes a control system to control nanoelectrofuel flow, charging, discharging, rebalancing, converting, or other desired processes.

In some embodiments, the first cell body and the second cell body are separately or together covered by a housing cover or a non-conductive cell body. In some embodiments, the housing is made, at least in part, of non-conductive material. In some embodiments, the housing engages one or more openings for the nanoelectrofuel inlet and outlet and circuit terminals. In some embodiments, the redox flow cell can be assembled with one nanoelectrofuel and one solid state electrode assembly in the form of a half-flow-cell configuration.

In another aspect, a redox flow battery is provided, which includes a plurality of redox flow cells as described herein. In some embodiments, the plurality of cells are arranged in electrical series and are defined by a stacked and repetitive arrangement. The cells can be stacked in various configurations to achieve the desired flow field, power and energy density. In some embodiments, the redox flow battery includes a plurality of flow cells in series or parallel. In some embodiments, the cells are stacked in a vertical configuration. In some embodiments, the cells are stacked in a cascade configuration. In some embodiments, the cells are stacked in a serpentine configuration. In some embodiments, the cells are stacked in an interdigited configuration. In some embodiments, multiple flow battery cells can be configured for optimal voltage and current performance in parallel and series gangable circuit orientations. In some embodiments individual flow cells can have larger or smaller internal volumes to accommodate electrical performance requirements.

Referring now to the drawings, a schematic nanoelectrofuel redox flow cell is illustrated in FIGS. 1-4. FIG. 1 depicts a schematic view of the external and internal structures, in one embodiment of the redox flow cell. The external structure depicts inlet/outlet fluid sealing compression/tapered thread fittings 110, 120, 130 and 140, which are made of a conductive material. A non-conducting or conducting housing 150 encloses the nanoelectrofuel flow cell. The internal structure shows the horizontally positioned first half-cell body 160, which is radially disposed around a portion of the vertically positioned second half-cell body 170. The first half-cell body includes an internal cylinder having a first end 180 distal to the second end 190. The second half-cell body has columns 200 forming the cylindrically shaped second half-cell body. A conductive membrane 210 is wrapped around the columns 200. The second half-cell body has a first end 220 and a distal second end 230. The cell also includes a first retaining member 240 and a second retaining member 250. The first half-cell body includes a chamber filled with a first current collector 260 and the second half-cell body includes a chamber filled with a second current collector 270.

FIG. 2 depicts a schematic view of a cross-section of one embodiment of the redox flow cell. The cross-sectional view shows the top down view of the first retaining member 240 inserted into a second retaining member 250 creating a radial flow of first half-cell body around the second half-cell body.

FIG. 3 depicts a schematic view of various parts of one embodiment of the redox flow cell. Schematic A depicts the non-conductive cell body or external housing of the redox flow cell having inlet/outlet fluid sealing compression/tapered thread fittings 130 and 140, which are made of a conductive material. Schematic B depicts a first half-cell body 160 including an internal cylinder having a first end 180 distal to the second end 190. Schematic C depicts the first retaining member which includes double O-ring seal and grove. Schematic D depicts the internal arrangement of the redox flow cell with a nonconductive cell body volume cut out for a well-defining member 350, a non-conductive cell body volume cut out for anodic/cathodic reaction chambers 360 and a nonconductive cell body volume cut out for the second half-cell body 170 inside a housing 150. Schematic E depicts side view of the second retaining member which includes a cylindrically-shaped body having a smooth thru hole bore configured to receive the second inlet, and configured to seal against the second inlet or the second half-cell body, and an outer seal configured to seal against the first half-cell body. Schematic F shows a secondary second half-cell body with tapped holes and inlet/outlet fluid sealing compression/tapered thread fitting made of a conductive material. Inlet/outlet fluid sealing compression/tapered thread fitting made of a conductive material second seal 250. Schematic G shows cross-sectional view of the cell with inlet/outlet fluid sealing compression/tapered thread fitting made of a conductive material shown, and tapped holes for securing the retaining members into the cell body of the internal and external structures of the redox flow cell. Schematic H shows top-down view of the first retaining member. Schematic I shows top-down view of the second retaining member.

FIG. 4 depicts a schematic diagram of three redox flow cell 400 in a parallel circuit configuration. The flow battery cells provide cathodic nanoelectrofuel inlets, cathodic nanoelectrofuel outlets, anodic nanoelectrofuel inlets, and anodic nanoelectrofuel outlets, all in a linear configuration. Electrical contact is made by tapping off of the either the inlets or outlets conductive compression fitting.

The rechargeable nanoelectrofuel redox flow cell technology described herein provides several advantages on conventional redox flow cell concepts. In the present redox flow cell, the cathodic and anodic electrolytes are stored externally to the battery and circulated through the cell(s) of the reactor as required, providing almost limitless number of charging and discharging cycles. In the present technology the energy transfer occurs at atomic/molecular level. High energy density of the nanoelectrofuel redox flow batteries is achieved with stable dispersions of solid electroactive nanoparticles in the liquid electrolyte. These systems provide high energy density. In some embodiments, the redox flow cell has an energy density of greater than about 20 Wh/l. This includes energy densities of greater than about 40 Wh/l, greater than about 100 Wh/l, greater than about 200 Wh/l, greater than about 500 Wh/l, greater than about 1000 Wh/l, or greater than about 1500 Wh/l. In some embodiments, the redox flow cell has an energy density of up to about 1100 Wh/l. In other embodiments, the energy densities are from about 20 Wh/l to about 1100 Wh/l.

The redox flow cell incorporates high energy density rechargeable, renewable and recyclable electrochemical electroactive nano-material fuel in a flow system that decouples power from stored energy. In the present technology the reduction/oxidation of the nanoparticles provide electrochemical energy storage. The nanoparticles are configured to provide electric double layers at the solid/liquid interface that may be utilized in supercapacitor energy storage. The nanoparticles provide for high surface area and nanoscale dimensions that provide for fast charge/discharge cycles. The nanoelectrofuels in a flow cell configuration provide higher energy densities per volume than conventional ion-based electrolytes in redox flow batteries.

For a nanoelectrofuel redox flow cell battery, the notable components are cathode nanoelectrofuel, anode nanoelectrofuel and the ion-exchange membrane. A variety of nanoparticle materials can be used for anode/cathode fluid, while a variety of base fluids can also be used in the compositions as described herein. Illustrative nanoelectrofuels and their components are described above. In some embodiments, the redox flow cell functions as an electrode that can be coupled with other currently available and under-development half-cell technologies, e.g. oxygen/air cathode.

The nanoelectrofuel compositions and redox flow cells of the present technology provide unique flexibility for use in a variety of applications. Along with the conventional stationary applications like back-up for wind and solar energy operations, the present nanoelectrofuel composition and redox flow cell technology is especially attractive for the transportation industry. The present technology offers high energy densities along with the mobility and convenience of gasoline. For example, the rechargeable nanoelectrofuels provide separate charging, storage, and discharging steps in time and location and can become a gasoline alternative for the transportation and portable devices. The technology makes possible, "refueling" in plug-in configurations or "mechanically" simply by replacing discharged nanoelectrofuels with charged nanoelectrofuels which are recycled at the "recharging stations," similar to a gas filling station where the spent nanoelectrofuels are removed from the EV and are replaced with charged nanoelectrofuels. This can be done relatively quickly with short wait times for customers when compared to full "plug-in" charging cycles. In embodiments where the nanoelectrofuels have an electric double layer between the nanoparticles and the fluids and the nanoelectrofuel serves as a supercapacitor, charging may be accomplished very quickly.

It is estimated that for an average density of transition metal oxides, the nanoparticles themselves will have a density of around 4.5 g/cm$^3$. With 10 vol % of solids, one liter of nanoelectrofuel would have 450 g of metal oxide, i.e. about 3 M (which is significantly higher than solubility of most transition metal salts) and at 2e$^-$ reduction will be capable of carrying a charge of ~580 kCoul which is equivalent to 321 Wh/l (or 237 Wh/kg) at cell voltage of 2 V (water based systems), and doubles if a voltage of 4V is achieved (Li-ion based systems). The volume fraction of nanoparticles can potentially be increased to 60% which would produce an energy density of 1100 Wh/l (~620 Wh/kg). Further increasing the nanoparticle concentration to 80 vol % will result in energy density of up to 1500 Wh/l. The flow battery requires two nanoelectrofuels to operate unless air/oxygen cathode is used, thus energy density for the case of flow battery with two nanoelectrofuels is 550 Wh/l. The packaging materials in the solid-state batteries are 50% of the battery weight, while flow battery because of external nanoelectrofuel storage tanks allows reducing the packaging down to 20%, thus the device specific energy density is estimated to be 440 Wh/l. As a result of the high energy density and extended life cycle of the nanoelectrofuels, the present rechargeable nanoelectrofuel flow battery technology will be economical for inclusion in devices such as EV batteries in electric vehicles.

Two types of rechargeable nanoelectrofuel systems were formulated and tested (a) water based suspension (0.1 M $H_2SO_4$) with graphene oxide platelets (f-GnP) decorated with polyoxotungstate ($H_3PW_{12}O_{40}$, abbreviated as PW12) (FIG. 5A); and (b) Li-ion electrolyte based (1M $LiPF_6$ in the 3:7 mixture of diethyl carbonate (DEC) and ethyl carbonate (EC) or dimethyl carbonate (DMC) with $Cu_6Sn_5$ nanoparticles (FIG. 5B). Both types of nanoparticles f-GnP/POM and $Cu_6Sn_5$ nanoparticles were synthesized in the lab through the custom wet chemical synthesis techniques.

The specific amounts of reagents used in the synthesis of $Cu_6Sn_5$ intermetallic nanoparticles and suitable reaction temperature is reported in Table 3, while general synthesis procedure is described below.

TABLE 3

Specific amounts of reagents used in $Cu_3Sn$ and $Cu_6Sn_5$ nanoparticle synthesis.

| Product | Sn nanoparticles in 100 ml of Ethylene Glycol (EG) | $NaH_2PO_2*H_2O$ in 150 ml of EG | $CuSO_4*5H_2O$ in 50 ml of EG | Reaction temperature | Product weight |
|---|---|---|---|---|---|
| $Cu_6Sn_5$ | 2.9 g (0.024M) | 7.9 g (0.075M) | 3.99 g (0.016M) | 110° C. | 2.9 g |

Suspension electrode technique in a three electrode cell configuration running in the potentiostatic regime (half-flow-cell), allows fine control of the electrochemistry of unsupported nanoparticles that acquire the surface potential (bulk and double layer charging) of the working electrode when in physical contact with it, while remaining unsupported in suspension. Electrochemical and thermophysical characterization of nanoelectrofuels and redox flow cells is conducted to determine the energy storage capacity and other fluid parameters that can be further used for flow and discharge modeling.

In one embodiment, the high energy density rechargeable nanoelectrofuel involves converting the high energy density Li-ion battery to a rechargeable nanoelectrofuel fuel and comparing its performance with the solid state form of this chemistry. In some embodiments, cathode materials based on transition metal oxides or a phosphate that have a composition of $LiMO_2$ or $LiMPO_4$ in the discharged state are used. The oxide and phosphate crystal structures act as host for $Li^+$ ions that may be added and then removed in these structures to compensate for the change in M oxidation state ($Mn^+/M^{(n+1)+}$) many times without causing significant or permanent changes in lattice symmetry. In some embodiments the high energy density anode materials are intermetallic compounds such as $Co_3Sn_4$, $Cu_6Sn_5$, Si, graphite and combination of thereof.

The present invention, thus generally described, will be understood more readily by reference to the following examples, which are provided by way of illustration and are not intended to be limiting of the present invention.

EXAMPLES

Example 1. Preparation and Testing of Nanoelectrofuel Compositions

This experiment demonstrates the lithiation/charging of unsupported nanoparticles in suspension, while nanoelectrofuel is being pumped through porous electrode.

Metallic tin (Sn) nanoparticles (<100 nm) manufactured by American Elements were suspended in ethylene glycol (EG) and sonicated for at least 10 min using Branson 450 Sonifier at 40% load and 50% duty cycle. The reactions were conducted in a 3 neck round bottom flask (500 ml) with nitrogen gas purge to provide an inert atmosphere and a continuous mixing by a magnetic stirrer. In the first step, reducing agent solution ($NaH_2PO_2*H_2O$) was added to the Sn nanoparticle suspension at the average addition rate of ~2 ml/min at room temperature. The mixture of Sn nanoparticles and reducing agent was then heated to a suitable reaction temperature (110° C. for $Cu_6Sn_5$). Further copper salt solution ($CuSO_4*5H_2O$) was slowly added to the reaction mixture at an average addition rate of ~1 ml/min. The reaction was continued for 30 min after the addition of copper salt solution was complete. Then the heating was terminated, and the mixture was cooled to room temperature at continued stirring and $N_2$ purge. The resulting solid product was separated from the reaction mixture by centrifugation followed by decanting and washed once with pure ethylene glycol (EG), 3 times with ethanol and once with acetone. XRD of the product showed pure $Cu_6Sn_5$ phase with minor impurities.

It is postulated that two major chemical processes occur during intermetallic nanoparticle synthesis:

1) Reduction of Copper by Reducing Agent:

$$Cu^{2+} + H_2PO_2^- + H_2O => Cu^0 + H_2PO_3^- + 2H^+$$

2) Displacement of Metallic Tin by Copper:

$$Sn^0 + Cu^{2+} => Sn^{2+} + C^0$$

The excess of reducing agent was used to remove any surface oxides from Sn nanoparticles and also to ensure the completeness of $Cu^{2+}$ reduction. To achieve maximum purity of the product the addition of reducing agent needs to be completed at room temperature and the reaction temperature during the addition of copper salt should be maintained steady.

The dispersions appeared to be marginally stable without use of surfactant for the time sufficient for the electrochemical tests. Additional stabilization is achieved using appropriate surface modifiers that are able to mediate the electron/Li+ ion transfer while improving the miscibility of nanoparticles with electrolyte, and their effect on red/ox processes will be conducted.

In some embodiments, for water based nanoelectrofuels, a horizontal half-flow-cell design (FIG. 6) was tested using an electrochemical test set-up. The horizontal half-flow-cell allows controlling the potential of the working electrode (W.E.) with regards to the reference electrode (R.E) (Ag/AgCl) as the nanoelectrofuel flows in the compartment between W.E and counter electrode (C.E). The shortage between W.E. and C.E is prevented by coating the C.E. with ion conductive membrane (e.g. Nafion). High surface area of the carbon felt extension of the working electrode allows nanoparticles to be electrochemically modified as they pass through it.

The CV of background electrolyte flowing through the cell and the nanoelectrofuel with 1 wt % of f-GnP/PW12 nanoparticles is demonstrated in FIG. 7. The additional current flowing due to the reduction of added nanoparticles is evident from the figure. A study of the dependence of electrochemical response on the nanoelectrofuels flow rate suggests that there is a maximum flow rate at which efficient charging of nanoparticles can occur. The flow rate is specific to the fluid viscosity and the cell configuration.

X-ray spectroscopy (XAS), specifically X-ray absorption near edge structure (XANES) spectroscopy and extended X-ray absorption fine structure (EXAFS) spectroscopy provide both electronic and atomic structural information about the nanoelectrofuel. The XANES region is sensitive to local electronic changes, specifically changes in oxidation state, while the EXAFS region is responsive to changes in atomic structure around the absorbing atom such as changes in coordination number, atomic identity, and atomic distances. This technique allows in-situ measurements on non-crystalline samples, making it a valuable resource for electrochemical research. FIG. 8 depicts the Ex-situ EXAFS/XANES characterization of as-prepared and electrochemically reduced water based f-GnP/PW$_{12}$ nanoelectrofuels conducted for all three W-L edges. The spectra depict an average of 3 scans and represent the shift in electronic density of polyoxometallates adsorbed onto f-GnP sheets. In water electrolyte PW12 can only be reduced for $\frac{1}{12}$e- or $\frac{1}{6}$e-per each tungsten atom, therefore small changes in spectra are expected.

The fact that similar changes are observed at both $L_{III}$ and $L_{II}$ edges, while no change is observed at $L_I$ edge is indicative of the change occurring at the tungsten outer shell. Further investigation of changes to f-GnP/PW$_{12}$ nanoelectrofuels with Raman spectroscopy showed strong changes in intensities of graphene oxide groups (FIG. 9). The efficiency of charge transfer upon charging/discharging is further evaluated electrochemically. The hybrid f-GnP/PW$_{12}$ material can also be used with Li-ion electrolyte, since the extended electrolyte stability will allow reaching theoretical electron capacity of 2e-per each W atom.

Further experiments were designed to conduct in-situ study of nanoelectrofuel reduction in a flow cell. An extension of the electrochemical flow cell, that allows examining the nanoelectrofuel as it comes out of the electrochemical flow cell, was developed.

A vertical half-flow cell design developed for the nanoelectrofuel flow battery is depicted in FIG. 10A which is tested using an experimental assembly inside a glovebox FIG. 10B. The vertical design addresses the gravity issues that may result in the trapped bubbles and loss of conductivity, although it uses the similar design principal as the horizontal cell illustrated in FIG. 6. Both designs draw on the concept of the nanoelectrofuel charge/discharge during the flow through the porous membrane electrode. In the first case a carbon felt was used as a porous electrode, and in the vertical cell a stainless steel filter (pore size ~10-20 micron) is used as the porous electrode. Both half-flow cell designs were demonstrated to work efficiently with the appropriate choice of electrode material for the tested system. Although the cells are illustrated as half-cell nanoelectrofuel electrodes, a complete flow battery cell can also be engineered using the nanoelectrofuels described herein.

The $Cu_6Sn_5$ nanoelectrofuel was "charged" inside the glovebox for 4 hours by holding the current collector potential at ~0.0 V vs. Li/Li+ while the nanoelectrofuel was circulated through the cell with the pump and then the samples of as prepared "unlithiated" suspensions and electrochemically lithiated $Cu_6Sn_5$ nanoelectrofuel were tested ex-situ with XAS at both Cu—K and Sn—K energy edges. Apparent changes in X-ray absorption spectra were observed before and after electrochemical treatment of both nanoelectrofuels, indicative of successful redox changes in unsupported nanoparticles (FIG. 11). Unlike in case of GnP/POT, for $Cu_6Sn_5$ nanoelectrofuel the change was observed to occur in the EXAFS region, which is indicative of the change of the nearest neighbors due to intercalation/deintercalation of Li+.

For a nanoelectrofuel to solid battery comparison, performance of the $Cu_6Sn_5$ nanoelectrofuel suspension electrode was evaluated in comparison of the same $Cu_6Sn_5$ nanoparticles mounted on the inert electrode (i.e. solid state battery configuration). The $Cu_6Sn_5$ nanoparticles were tested in a conventional coin cell charge/discharge cycles. Electrode specimens were extracted at different lithiation stages, as illustrated in FIG. 12A and FIG. 12B, and the XAS spectra of those electrodes were studied. It was observed that the most significant changes during the lithiation of $Cu_6Sn_5$ nanoparticles are observed at Sn—K edge.

FIG. 13A illustrates comparative changes in R-space in the $Cu_6Sn_5$ samples extracted from coin cell at different stages of the electrode lithiation. FIG. 13B illustrates changes observed during the electrochemical treatment of the nanoelectrofuel in the flow cell. It was observed that changes in nanoelectrofuel structure follow the trend observed during the lithiation in the coin cell electrode, but lithiation of dispersed unsupported nanoparticles in tested charge mode was incomplete. This is most likely related to the limited time of nanoelectrofuel charging (1 hr at 0.23V and 1 hr at 0.01V vs. Li/Li+), pumping rate or other electrochemical cell parameters which can be optimized to achieve higher charging/discharging efficiency in suspension electrode configuration.

Preliminary tests were conducted utilizing the first and second generation coin cell design and the CV data for $Cu_6Sn_5$ nanoparticles was collected using the coin cell (FIG. 14) and fluorescence signal from the $Cu_6Sn_5$ nanoparticle electrode. The new cell design hermetically seals the electrolyte cell bodies without electrolyte leaks and evaporations, and can be safely tested outside the glovebox environment. For effective battery operation, good electric contact between the charged particles and the current collector over the long term is required. For solid state rechargeable batteries, it is known that the charged particles tend to loose the contact during the volume expansion in lithiation/delithiation cycles. However, in the present rechargeable nanoelectrofuel system, this problem is resolved because the nanoparticles are unsupported, and because the change in nanoparticle volume upon lithiation does not affect the integrity and performance of the electrode. In-situ results for electrode potential control and XAFS signal change on the partial lithiation/delithiation of the nanoparticles in a coin cell configuration are shown in FIGS. 15A and 15B.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A redox flow battery comprising:
a plurality of redox flow cells, each of which includes a first half-cell body having a first inlet and a second half cell body having a second inlet;
a membrane separating the first half-cell body and the second half-cell body;
a first nanoelectrofuel reservoir in fluid communication with the first inlet and a second nanoelectrofuel reservoir in fluid communication with the second inlet; and
at least one pump configured to pump a first nanoelectrofuel from the first nanoelectrofuel reservoir through the first half-cell body and to pump a second nanoelectrofuel from the second nanoelectrofuel reservoir through the second half-cell body,
wherein:
the first nanoelectrofuel is an anodic nanoelectrofuel that contains a stable suspension of electroactive anode nanoparticles, the first nanoelectrofuel being a liquid having a viscosity at room temperature of less than 10,000 cP;
the second nanoelectrofuel is a cathodic nanoelectrofuel that contains a stable suspension of electroactive cathode nanoparticles, the second nanoelectrofuel being a liquid having a viscosity at room temperature of less than 10,000 cP;
the electroactive anode nanoparticles and the electroactive cathode nanoparticles are surface modified for forming the stable suspension by anchoring of an organic ion to the electroactive anode nanoparticles and the electroactive cathode nanoparticles; and
the organic ion comprises a silane group, a mercapto group, or a phosphine group.

2. The redox flow battery of claim 1, wherein the first half-cell body contains a first current collector comprising a first conductive shot, a first conductive fiber, or a first conductive mesh, and the second half-cell body contains a second current collector comprising a second conductive shot, a second conductive fiber, or a second conductive mesh.

3. The redox flow battery of claim 1, wherein the first nanoelectrofuel and the second nanoelectrofuel are rechargeable.

4. The redox flow battery of claim 1, wherein the first nanoelectrofuel and the second nanoelectrofuel each have a viscosity at room temperature of less than 100 cP.

5. The redox flow battery of claim 1, wherein the first nanoelectrofuel contains up to 80% by volume of the electroactive anode nanoparticles and the second nanoelectrofuel contains up to 80% by volume of the electroactive cathode nanoparticles.

6. The redox flow battery of claim 1, wherein the first and second nanoelectrofuels include an electrolyte, and the first nanoelectrofuel contains 10 to 60% by volume of the electroactive anode nanoparticles, and the second nanoelectrofuel contains 10 to 60% by volume of the electroactive cathode nanoparticles.

7. The redox flow battery of claim 5, wherein the first nanoelectrofuel and/or the second nanoelectrofuel are solventless nanoelectrofuels containing self-suspended electroactive nanoparticles surface modified with an organic ion and mixed with an organic counter-ion, whereby the mixture exhibits fluid behavior.

8. The redox flow battery of claim 1, wherein each redox flow cell has a volumetric energy density greater than about 100 Wh/l.

9. The redox flow battery of claim 1, wherein the electroactive anode nanoparticles and the electroactive cathode nanoparticles have at least one dimension of about 1 nm to about 500 nm.

10. The redox flow battery of claim 1, wherein the electroactive anode nanoparticles and the electroactive cathode nanoparticles comprise an intermetallic compound, a metal alloy, a carbonaceous material, a metal oxide or hydroxide, a mixed metal oxide or hydroxide, a partially fluorinated metal oxide, a partially fluorinated metal phosphate, or a metal phosphate.

11. The redox flow battery of claim 10, wherein the electroactive anode nanoparticles and the electroactive cathode nanoparticles comprise an intercalating ion A; a transition metal M; or compounds of formula $A_yMO_x$, $A_yM_1M_2O_x$, $A_yMPO_4$, and/or $A_yM_1M_2PO_4$, where y is from 0 to 2 and x is from 2 to 4; A is Li, Na, K, Cs, Mg, or Al; and M, $M_1$ and $M_2$ are, independently, Ag, Si, Sn, Ti, Ni, Fe, Co, Mn, V, Mo, W, Zr, Zn, Cr, or Ce.

12. The redox flow battery of claim 1, wherein the organic ion is an organic cation comprising mercapto-alkyl-ammonium, mercapto-imidazolium, mercaptophosphonium, or mercapto-pyrrolidonium salt.

13. The redox flow battery of claim 6, wherein the electrolyte includes an aqueous solution comprising a salt selected from a chloride, a perchlorate, a phosphate, a sulphate, and a nitrate.

14. The redox flow battery of claim 6, wherein the electrolyte comprises an ionic salt and a polar solvent.

15. The redox flow battery of claim 14, wherein the ionic salt is $Li[(C_2O_4)_2B]$, $Li[BF_2(C_2O_4)]$, $Li[PF_2(C_2O_4)_2]$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiN(SO_2C_2F_5)_2$, a lithium alkyl fluorophosphate, LiOH, KOH, NaOH, LiCl, NaCl, KCl, $CaCl_2$, $MgCl_2$, $NH_4Cl$, $NaClO_4$, $KClO_4$, $NH_4ClO_4$, $Ca(ClO_4)_2$, $Mg(ClO_4)_2$, $Na_2HPO_4$, $NaH_2PO_4$, $KH_2PO_4$, $K_2HPO_4$, $Li_2HPO_4$, $Li_3PO_4$, $Li_2SO_4$, $Na_2SO_4$, $K_2SO_4$, $(NH_4)_2SO_4$, $LiNO_3$, $NaNO_3$, $KNO_3$, $NH_4NO_3$, or $KNO_2$.

16. The redox flow battery of claim 14, wherein the polar solvent comprises water, ionic liquids, ethylene carbonate, dimethyl carbonate, diethyl carbonate, ethylmethyl carbonate, dipropyl carbonate, propylene carbonate, methyl butyrate, γ-butyrolactone, N-methylpyrrolidinone, or vinylene carbonate.

17. A redox flow battery comprising:
a plurality of redox flow cells, each of which includes a first half-cell body having a first inlet and a second half cell body having a second inlet;
a membrane separating the first half-cell body and the second half-cell body;
a first nanoelectrofuel reservoir in fluid communication with the first inlet and a second nanoelectrofuel reservoir in fluid communication with the second inlet; and
at least one pump configured to pump a first nanoelectrofuel from the first nanoelectrofuel reservoir through the first half-cell body and to pump a second nanoelectrofuel from the second nanoelectrofuel reservoir through the second half-cell body,
wherein:
the first nanoelectrofuel is an anodic nanoelectrofuel that contains a stable suspension of electroactive anode nanoparticles, the first nanoelectrofuel being a liquid having a viscosity at room temperature of less than 10,000 cP;
the second nanoelectrofuel is a cathodic nanoelectrofuel that contains a stable suspension of electroactive cathode nanoparticles, the second nanoelectrofuel being a liquid having a viscosity at room temperature of less than 10,000 cP; and
the first nanoelectrofuel and/or the second nanoelectrofuel are solventless nanoelectrofuels containing self-suspended electroactive nanoparticles surface modified with an organic ion and mixed with an organic counter-ion, whereby the mixture exhibits fluid behavior.

18. The redox flow battery of claim 17, wherein the organic ion is an organic cation comprising mercapto-alkyl-ammonium, mercapto-imidazolium, mercaptophosphonium, or mercapto-pyrrolidonium salt, or an organic anion comprising a carboxylate, a phosphate, a sulphate, a nitrate, or a sulfonate.

* * * * *